(12) United States Patent
Kuroda et al.

(10) Patent No.: US 12,461,236 B2
(45) Date of Patent: Nov. 4, 2025

(54) ELECTRONIC DEVICE, METHOD FOR CONTROLLING ELECTRONIC DEVICE, AND PROGRAM

(71) Applicant: KYOCERA Corporation, Kyoto (JP)

(72) Inventors: Jun Kuroda, Kodaira (JP); Tooru Sahara, Yokohama (JP); Fangwei Tong, Machida (JP); Takuya Homma, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 267 days.

(21) Appl. No.: 18/004,177

(22) PCT Filed: Jul. 6, 2021

(86) PCT No.: PCT/JP2021/025517
§ 371 (c)(1),
(2) Date: Jan. 3, 2023

(87) PCT Pub. No.: WO2022/024690
PCT Pub. Date: Feb. 3, 2022

(65) Prior Publication Data
US 2023/0288557 A1    Sep. 14, 2023

(30) Foreign Application Priority Data
Jul. 29, 2020 (JP) .................. 2020-128614

(51) Int. Cl.
*G01S 15/42* (2006.01)
*G01S 13/42* (2006.01)

(52) U.S. Cl.
CPC .............. *G01S 15/42* (2013.01); *G01S 13/42* (2013.01)

(58) Field of Classification Search
None
See application file for complete search history.

(56) References Cited

U.S. PATENT DOCUMENTS 7,982,670 B2 * 7/2011 Mestre Pons ............. G01S 3/74
342/417
10,852,410 B2 * 12/2020 Shirakawa ............... G01S 3/74
(Continued)

FOREIGN PATENT DOCUMENTS

| CN | 110058206 A | * 7/2019 | ............. G01S 7/418 |
|---|---|---|---|
| JP | 2013-152239 A | 8/2013 | |
| JP | 2016-080369 A | 5/2016 | |

OTHER PUBLICATIONS

Chunping, An Improved Algorithm of Past and Root-Music for Signal Frequency Tracking, IEEE, 159-163 (Year: 2010).*

(Continued)

*Primary Examiner* — Isam A Alsomiri
*Assistant Examiner* — Vikas Atmakuri
(74) *Attorney, Agent, or Firm* — Studebaker Brackett PLLC

(57) ABSTRACT

An electronic device includes a transmission antenna that transmits a transmission wave, a plurality of reception antennas that receive a reflected wave that is the transmission wave having been reflected, and a signal processing unit that detects an object with a subspace method, based on a transmission signal transmitted as the transmission wave and a reception signal received as the reflected wave. The signal processing unit estimates a direction of arrival of the reflected wave, based on solutions of an algebraic equation Root-MUSIC Polynomial (hereinafter referred to as "RMP solutions") in a Root-MUSIC method that satisfy a first requirement and a second requirement in terms of positions of the RMP solutions in a complex plane. The first requirement is a requirement related to a distance between a unit circle and each of the RMP solutions in the complex plane. The second requirement is a requirement related to a dis- (Continued)

tance or an argument between at least two adjacent RMP solutions among the RMP solutions in the complex plane.

16 Claims, 11 Drawing Sheets

(56) References Cited

U.S. PATENT DOCUMENTS

| | | | | |
|---|---|---|---|---|
| 2020/0302237 | A1* | 9/2020 | Hennings Yeomans | ..................... G06V 20/56 |
| 2021/0025969 | A1* | 1/2021 | Ouchi | ................... G01S 13/931 |
| 2021/0033706 | A1* | 2/2021 | Funaya | ................... G06V 20/64 |
| 2021/0049828 | A1* | 2/2021 | Park | ....................... H04N 19/30 |
| 2021/0209776 | A1* | 7/2021 | Huang | ....................... G06T 7/90 |
| 2022/0130074 | A1* | 4/2022 | Zheng | ....................... G06T 9/00 |

OTHER PUBLICATIONS

Nobuyoshi, Adaptive Signal Processing with Array Antenna, Chapter 10—Direction of Arrival Estimation Method Using Eigenvalues and Eigenvectors of Correlation Matrix (Year: 1998).*
Teague, Root-Music Direction Finding Applied to Multifrequency Coastal Radar, IEEE, 1896-1898 (Year: 2002).*
Ogawa, High Resolution Techniques in Signal Processing Antennas, IEICE Trans Commun, vol. E78-B, 1435-1442 (Year: 1995).*
Yamada, Detection Performance of Coherent Signals by the Polarization Averaging Music Algorithm, Electronics and Communications in Japan, Part 2, vol. 84, No. 7, 1739-1746 (Year: 2001).*
Kim, Vehicle Black Box with 24GHz FMCW Radar, IEEE, 1392-1396 (Year: 2016).*
Rao, Performance analysis of Root-Music, IEEE Transaction on acoustics, speech and signal processing, (Year: 1989).*
Zoltowski, Beamspace Root-Music, IEEE Transactions on Signal processing (Year: 1993).*
Kim Jung-Hwan et al., "Vehicle black box with 24GHz FMCW radar", 2016 IEEE Region 10 Conference (TENCON), Nov. 22, 2016, pp. 1392-1396, doi: 10.1109/TENCON.2016.7848243, IEEE.
Teague C. C., "Root-Music direction finding applied to multifrequency coastal radar", IEEE International Geoscience and Remote Sensing Symposium, IEEE, vol. 3, Jun. 24, 2002, pp. 1896-1898.
Chunping Wang et al., "An improved algorithm of Past and Root-Music for signal frequency tracking", 2010 3rd International Conference on Computer Science and Information Technology (ICCSIT), IEEE, Jul. 9, 2010, pp. 159-163.
Kikuma, Nobuyoshi et al.; Adaptive Signal Processing with Array Antenna; Kagaku Gijutsu Shuppan, Inc.; Nov. 25, 1998, pp. 191-209.
Yamada, Hiroyoshi et al.; Detection Performance of Coherent Signals by the Polarization Averaging Music Algorithm; The Transactions of the Institute of Electronics, Information and Communications Engineers B; vol. J82-B, No. 9, Sep. 25, 1999; pp. 1739-1746.

* cited by examiner

ELECTRONIC DEVICE, METHOD FOR CONTROLLING ELECTRONIC DEVICE, AND PROGRAM

CROSS-REFERENCE TO RELATED APPLICATIONS

This application claims priority from Japanese Patent Application No. 2020-128614 filed in Japan on Jul. 29, 2020, the entire disclosure of which is incorporated herein by reference.

TECHNICAL FIELD

The present disclosure relates to an electronic device, a method for controlling an electronic device, and a program.

BACKGROUND ART

For example, in fields such as automobile-related industries, a technology for measuring a distance or the like between a vehicle of interest and a predetermined object is regarded as important. Recently, various studies have been conducted particularly on a radar (Radio Detecting and Ranging) technology for measuring a distance or the like to an object such as an obstacle by transmitting a radio wave such as a millimeter wave and by receiving a reflected wave reflected off the object. Such a technology for measuring a distance or the like expectedly becomes more important in the future with progresses of a technology for assisting drivers in driving and an automated-driving-related technology for partially or entirely automating driving.

In relation to the technology described above, various techniques, such as a technique for calculating or estimating a relative velocity of a detected object with respect to an apparatus of interest and a technique for calculating or estimating an angle at which the detected object is present with respect to the apparatus of interest, have been proposed. For example, PTL 1 has proposed a method that enables calibration to be efficiently performed when an angle at which an object is present with respect to an apparatus of interest is estimated. PTL 2 has proposed a method that enables the number of incoming waves to be accurately estimated when a direction of the incoming waves is estimated through incoming wave estimation using eigendecomposition.

CITATION LIST

Patent Literature

PTL 1: Japanese Unexamined Patent Application Publication No. 2016-80369
PTL 2: Japanese Unexamined Patent Application Publication No. 2013-152239

SUMMARY OF INVENTION

In one embodiment, an electronic device includes
a transmission antenna that transmits a transmission wave,
a plurality of reception antennas that receive a reflected wave that is the transmission wave having been reflected, and
a signal processing unit that detects an object with a subspace method, based on a transmission signal transmitted as the transmission wave and a reception signal received as the reflected wave.

The signal processing unit estimates a direction of arrival of the reflected wave, based on solutions of an algebraic equation Root-MUSIC Polynomial (hereinafter referred to as "RMP solutions") in a Root-MUSIC method that satisfy a first requirement and a second requirement in terms of positions of the RMP solutions in a complex plane,
the first requirement being a requirement related to a distance between a unit circle and each of the RMP solutions in the complex plane,
the second requirement being a requirement related to a distance or an argument between at least two adjacent RMP solutions among the RMP solutions in the complex plane.

In one embodiment, an electronic device includes
a plurality of sensors that receive a sound wave or an ultrasonic wave from a sound source, and
a signal processing unit that detects an object with a subspace method, based on a reception signal received as the sound wave or the ultrasonic wave.

The signal processing unit estimates a direction of arrival of the sound wave or the ultrasonic wave, based on solutions of an algebraic equation Root-MUSIC Polynomial (hereinafter referred to as "RMP solutions") in a Root-MUSIC method that satisfy a first requirement and a second requirement in terms of positions of the RMP solutions in a complex plane,
the first requirement being a requirement related to a distance between a unit circle and each of the RMP solutions in the complex plane,
the second requirement being a requirement related to a distance or an argument between at least two adjacent RMP solutions among the RMP solutions in the complex plane.

In one embodiment, a method for controlling an electronic device, includes
a step of transmitting a transmission wave with a transmission antenna,
a step of receiving, with a plurality of reception antennas, a reflected wave that is the transmission wave having been reflected,
a step of detecting an object with a subspace method, based on a transmission signal transmitted as the transmission wave and a reception signal received as the reflected wave, and
a step of estimating a direction of arrival of the reflected wave, based on solutions of an algebraic equation Root-MUSIC Polynomial (hereinafter referred to as "RMP solutions") in a Root-MUSIC method that satisfy a first requirement and a second requirement in terms of positions of the RMP solutions in a complex plane,
the first requirement being a requirement related to a distance between a unit circle and each of the RMP solutions in the complex plane,
the second requirement being a requirement related to a distance or an argument between at least two adjacent RMP solutions among the RMP solutions in the complex plane.

In one embodiment, a program causes
a computer to perform
a step of transmitting a transmission wave with a transmission antenna,
a step of receiving, with a plurality of reception antennas, a reflected wave that is the transmission wave having been reflected, a step of detecting an object with a subspace method, based on a transmission signal transmitted as the transmission wave and a reception signal received as the reflected wave, and a step of estimating a direction of arrival of the reflected wave, based on solutions of an algebraic equation Root-MUSIC Polynomial (hereinafter referred to as "RMP solutions") in a Root-MUSIC method that satisfy a first requirement and a second requirement in terms of positions of the RMP solutions in a complex plane, the first requirement being a requirement related to a distance between a unit circle and each of the RMP solutions in the complex plane, the second requirement being a requirement related to a distance or an argument between at least two adjacent RMP solutions among the RMP solutions in the complex plane.

In one embodiment, an electronic device includes a transmission antenna that transmits a transmission wave, a plurality of reception antennas that receive a reflected wave that is the transmission wave having been reflected, a signal processing unit that detects an object with a subspace method, based on a transmission signal transmitted as the transmission wave and a reception signal received as the reflected wave, and a display unit that displays an image.

The signal processing unit estimates a direction of arrival of the reflected wave by removing a solution not satisfying a requirement related to a position of an RMP solution in a complex plane.

The display unit displays the estimated direction of arrival.

DESCRIPTION OF EMBODIMENTS

The object detection accuracy is desirably improved in a technology for detecting a predetermined object by receiving a reflected wave that is a transmitted transmission wave reflected off the object. An objective of the present disclosure is to provide an electronic device, a method for controlling an electronic device, and a program that may improve the object detection accuracy. According to one embodiment, an electronic device, a method for controlling an electronic device, and a program that may improve the object detection accuracy can be provided. One embodiment is described in detail below with reference to the drawings.

An electronic device according to one embodiment is mounted in a vehicle (mobility device) such as an automobile, for example, and thus is capable of detecting a predetermined object located around the mobility device. To this end, the electronic device according to the one embodiment is capable of transmitting a transmission wave to an area around the mobility device from a transmission antenna installed on the mobility device. The electronic device according to the one embodiment is also capable of receiving a reflected wave that is the reflected transmission wave, from a reception antenna installed on the mobility device. At least one of the transmission antenna or the reception antenna may be included in a radar sensor or the like installed on the mobility device, for example.

A configuration in which the electronic device according to the one embodiment is mounted in an automobile such as a passenger car is described below as a typical example. However, the mobility device in which the electronic device according to the one embodiment is mounted is not limited to an automobile. The electronic device according to the one embodiment may be mounted in various mobility devices such as an autonomous car, a bus, a taxi, a truck, a motorcycle, a bicycle, a ship, an aircraft, a helicopter, agricultural machinery such as a tractor, a snowplow, a garbage truck, a police car, an ambulance, and a drone. The mobility device in which the electronic device according to the one embodiment is mounted is not necessarily limited also to a mobility device that moves by its own motive power. For example, the mobility device in which the electronic device according to the one embodiment is mounted may be a trailer towed by a tractor. The electronic device according to the one embodiment is capable of measuring a distance or the like between the sensor and a predetermined object when at least one of the sensor or the object is movable. The electronic device according to the one embodiment is also capable of measuring the distance or the like between the sensor and the object even when both the sensor and the object are stationary.

An example of how the electronic device according to the one embodiment detects an object is described first.

Figure 1:
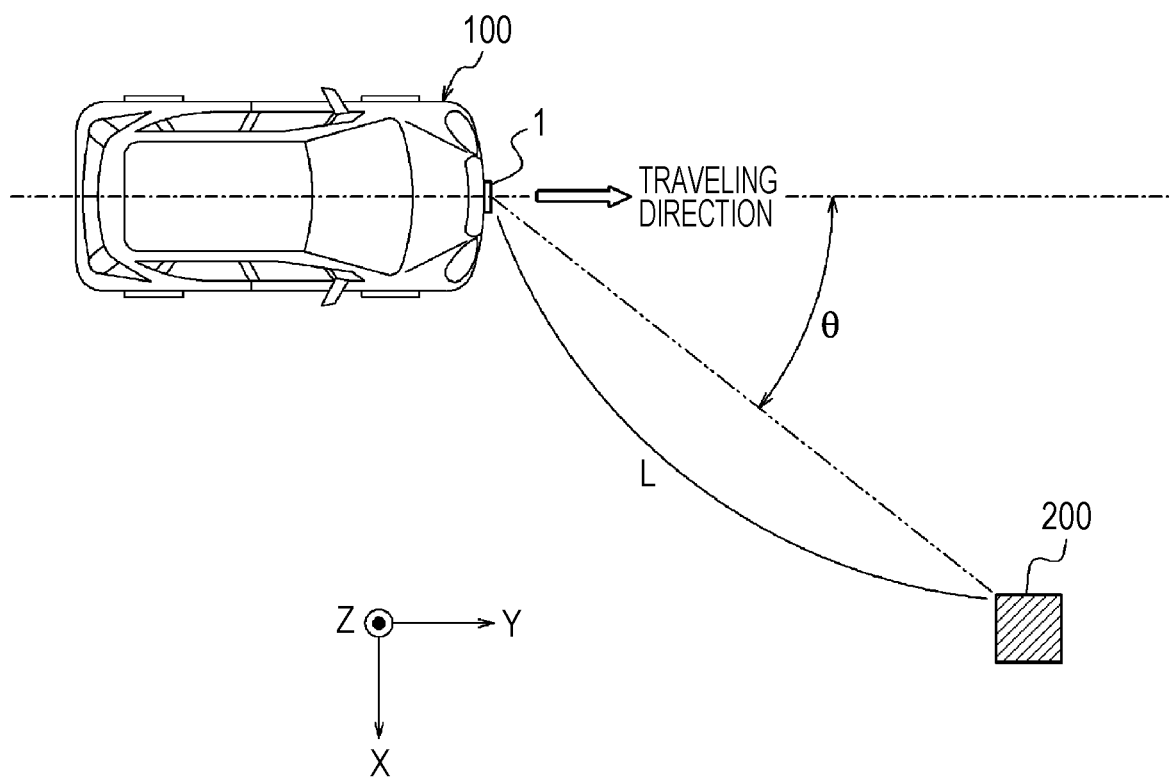
FIG. 1 is a diagram for describing how an electronic device according to one embodiment is used.

FIG. 1 is a diagram for describing how the electronic device according to the one embodiment is used. FIG. 1 illustrates an example in which the electronic device, according to the one embodiment, including a transmission antenna and a reception antenna is installed on a mobility device.

An electronic device 1, according to the one embodiment, including a transmission antenna and a reception antenna is installed on a mobility device 100 illustrated in FIG. 1. The electronic device 1 according to the one embodiment may be mounted (for example, built) in the mobility device 100 illustrated in FIG. 1. A specific configuration of the electronic device 1 is described later. As described below, the electronic device 1 may include at least one of the transmission antenna or the reception antenna, for example. The mobility device 100 illustrated in FIG. 1 may be an automotive vehicle such as a passenger car but may be a mobility device of any type. In FIG. 1, the mobility device 100 may move (travel or slowly travel), for example, in a positive Y-axis direction (traveling direction) illustrated in FIG. 1 or in another direction, or may be stationary without moving.

As illustrated in FIG. 1, the electronic device 1 including the transmission antenna is installed on the mobility device 100. In the example illustrated in FIG. 1, only one electronic device 1 including the transmission antenna and the reception antenna is installed at a front portion of the mobility device 100. The position where the electronic device 1 is installed on the mobility device 100 is not limited to the position illustrated in FIG. 1 and may be another appropriate position. For example, the electronic device 1 illustrated in FIG. 1 may be installed on a left side, on a right side, and/or at a rear portion of the mobility device 100. The number of such electronic devices 1 may be any number equal to or greater than 1 depending on various conditions (or requirements) such as a range and/or an accuracy of measurement performed at the mobility device 100. The electronic device 1 may be installed inside the mobility device 100. The inside the mobility device 100 may be, for example, a space inside a bumper, a space inside a body, a space inside a headlight, or a space such as a driver's space.

The electronic device 1 transmits an electromagnetic wave as a transmission wave from the transmission antenna. For example, when a predetermined object (for example, an object 200 illustrated in FIG. 1) is located around the mobility device 100, at least part of the transmission wave transmitted from the electronic device 1 is reflected off the object to become a reflected wave. For example, the reception antenna of the electronic device 1 then receives such a reflected wave. In this manner, the electronic device 1 mounted in the mobility device 100 can detect the object.

The electronic device 1 including the transmission antenna may be typically a radar (Radio Detecting and Ranging) sensor that transmits and receives a radio wave. However, the electronic device 1 is not limited to a radar sensor. The electronic device 1 according to the one embodiment may be, for example, a sensor based on the LIDAR (Light Detection and Ranging, Laser Imaging Detection and Ranging) technology that uses an optical wave. Each of these sensors can include, for example, a patch antenna. Since the technologies such as RADAR and LIDAR are already known, detailed description may be appropriately simplified or omitted. As described below, the electronic device 1 according to the one embodiment may be implemented as a sensor that receives a sound wave, an ultrasonic wave, or the like.

The electronic device 1 mounted in the mobility device 100 illustrated in FIG. 1 receives, from the reception antenna, the reflected wave of the transmission wave transmitted from the transmission antenna. In this manner, the electronic device 1 can detect the predetermined object 200 located within a predetermined distance from the mobility device 100. For example, as illustrated in FIG. 1, the electronic device 1 can measure a distance L between the mobility device 100, which is a vehicle of interest, and the predetermined object 200. The electronic device 1 can also measure a relative velocity between the mobility device 100, which is the vehicle of interest, and the predetermined object 200. The electronic device 1 can further measure a direction (an angle of arrival θ) from which the reflected wave from the predetermined object 200 arrives at the mobility device 100, which is the vehicle of interest. Hereinafter, an angle at which a signal such as the reflected wave from the object 200 arrives at the electronic device 1 is also referred to as an "angle of arrival".

The object 200 may be, for example, at least any of an oncoming automobile traveling in a lane adjacent to a lane of the mobility device 100, an automobile traveling side by side with the mobility device 100, an automobile traveling in front of or behind the mobility device 100 in the same lane, and the like. The object 200 may also be any object located around the mobility device 100, such as a motorcycle, a bicycle, a stroller, a person such as a pedestrian, an animal, other forms of life such as an insect, a guardrail, a median strip, a road sign, a step on a sidewalk, a wall, a maintenance hole, or an obstacle. The object 200 may be in motion or stationary. For example, the object 200 may be an automobile or the like that is parked or stationary around the mobility device 100.

In FIG. 1, a ratio between a size of the electronic device 1 and a size of the mobility device 100 does not necessarily indicate an actual ratio. FIG. 1 illustrates the electronic device 1 that is installed on an outer portion of the mobility device 100. However, in one embodiment, the electronic device 1 may be installed at various positions of the mobility device 100. For example, in one embodiment, the electronic device 1 may be installed inside a bumper of the mobility device 100 so as not to be seen in the appearance of the mobility device 100.

Description is given below on the assumption that the transmission antenna of the electronic device 1 transmits a radio wave in a frequency band, such as a millimeter wave (equal to or higher than 30 GHz) or a quasi-millimeter wave (for example, around 20 GHz to 30 GHz) as a typical example. For example, the transmission antenna of a sensor 5 may transmit a radio wave having a frequency bandwidth of 4 GHZ such as from 77 GHz to 81 GHZ.

Figure 2:
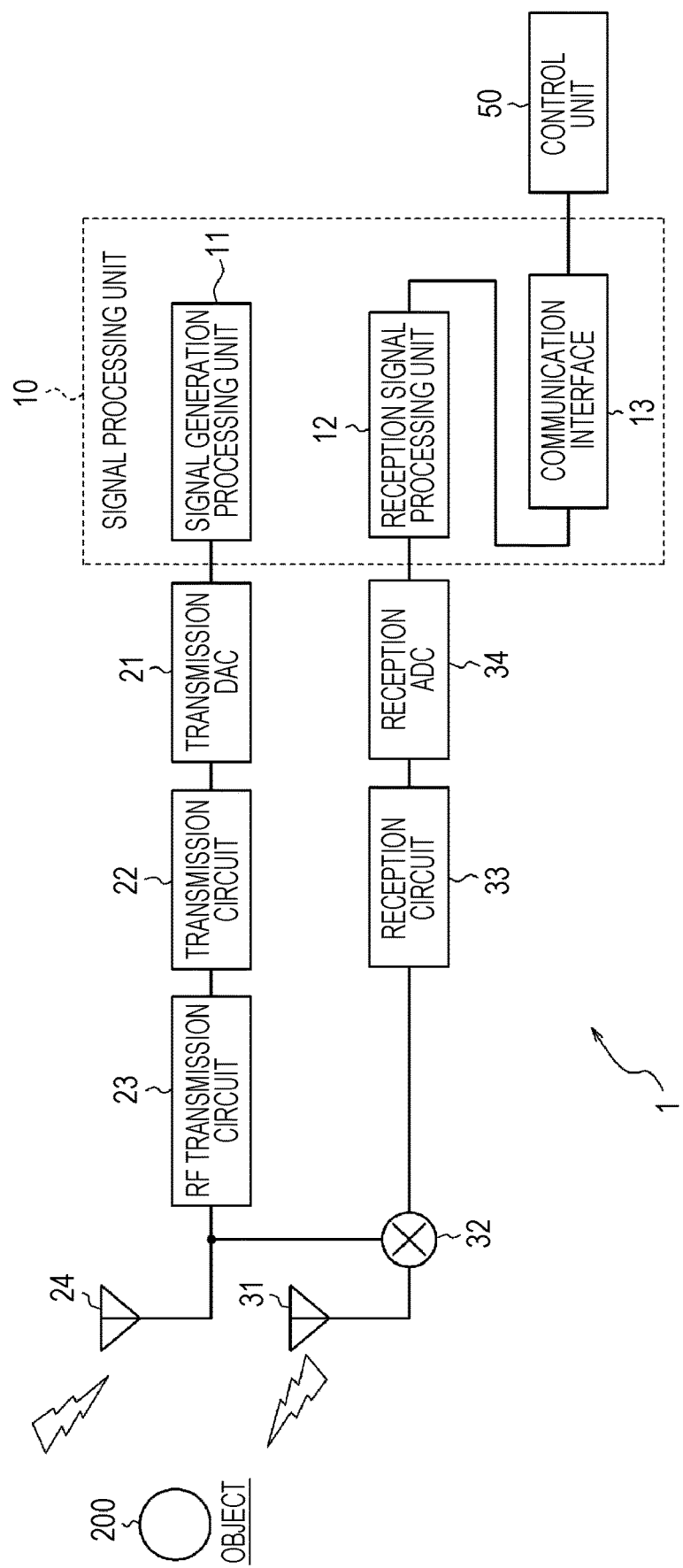
FIG. 2 is a functional block diagram schematically illustrating a configuration of the electronic device according to the one embodiment.

FIG. 2 is a functional block diagram schematically illustrating a configuration example of the electronic device 1 according to the one embodiment. An example of the configuration of the electronic device 1 according to the one embodiment is described below.

When a distance or the like is measured by using a millimeter-wave radar, a frequency-modulated continuous wave radar (hereinafter, referred to as an FMCW radar) is often used. The FMCW radar sweeps a frequency of a to-be-transmitted radio wave to generate a transmission signal. Thus, a frequency of the radio wave used by such a millimeter-wave FMCW radar, which uses a radio wave of a frequency band of 79 GHZ, for example, has a frequency bandwidth of 4 GHz such as from 77 GHz to 81 GHZ, for example. The radar of the frequency bandwidth of 79 GHz has a characteristic that the usable frequency bandwidth is wider than that of another millimeter-wave and/or quasi-millimeter-wave radar of a frequency band of 24 GHz, 60 GHZ, or 76 GHz, for example. Such an embodiment is described below as an example.

As illustrated in FIG. 2, the electronic device 1 according to the one embodiment includes a signal processing unit 10. The signal processing unit 10 may include a signal generation processing unit 11, a reception signal processing unit 12, and a communication interface 13. The electronic device 1 according to the one embodiment also includes, as a transmission unit, a transmission DAC 21, a transmission circuit 22, an RF transmission circuit 23, and a transmission antenna array 24. The electronic device 1 according to the one embodiment also includes, as a reception unit, a reception antenna array 31, a mixer 32, a reception circuit 33, and a reception ADC 34. The electronic device 1 according to one embodiment may omit at least any of the functional units illustrated in FIG. 2, or may include a functional unit other than the functional units illustrated in FIG. 2. The electronic device 1 illustrated in FIG. 2 may be configured by using a circuit that is configured basically in the same and/or similar manner as/to a general radar that uses an electromagnetic wave in a millimeter wave band or the like. On the other hand, signal processing performed by the signal processing unit 10 in the electronic device 1 according to the one embodiment includes processing different from that performed by the general radar of the related art.

The signal processing unit 10 included in the electronic device 1 according to the one embodiment is capable of controlling the individual functional units of the electronic device 1 and also controlling operations of the entire electronic device 1. In particular, the signal processing unit 10 performs various kinds of processing on signals handled by the electronic device 1. To provide control and processing capabilities for executing various functions, the signal processing unit 10 may include at least one processor, for example, a CPU (Central Processing Unit) or a DSP (Digital Signal Processor). The signal processing unit 10 may be collectively implemented by one processor, may be implemented by some processors, or may be implemented by discrete individual processors. The processor may be implemented as one integrated circuit. The integrated circuit is also referred to as an IC. The processor may be implemented as a plurality of integrated circuits and discrete circuits connected to be able to perform communication. The processor may be implemented on the basis of various other known technologies. In the one embodiment, the signal processing unit 10 may be configured as, for example, a CPU (hardware) and a program (software) executed by the CPU. The signal processing unit 10 may appropriately include a memory required for operations of the signal processing unit 10.

The signal generation processing unit 11 of the signal processing unit 10 generates a signal to be transmitted from the electronic device 1. In the electronic device 1 according to the one embodiment, the signal generation processing unit 11 may generate a transmission signal (transmission chirp signal) such as a chirp signal, for example. In particular, the signal generation processing unit 11 may generate a signal (linear chirp signal) whose frequency changes linearly and periodically. For example, the signal generation processing unit 11 may generate a chirp signal whose frequency linearly and periodically increases from 77 GHz to 81 GHz as time elapses. For example, the signal generation processing unit 11 may generate a signal whose frequency periodically repeats a linear increase (up-chirp) from 77 GHz to 81 GHZ and a decrease (down-chirp) as time elapses. The signal generated by the signal generation processing unit 11 may be set in advance by the signal processing unit 10, for example. The signal generated by the signal generation processing unit 11 may be stored in advance in a storage unit or the like of the signal processing unit 10, for example. Since chirp signals used in a technical field such as the radar are known, more detailed description is appropriately simplified or omitted. The signal generated by the signal generation processing unit 11 is supplied to the transmission DAC 21. Thus, the signal generation processing unit 11 may be coupled to the transmission DAC 21.

The transmission DAC (digital-to-analog converter) 21 has a function of converting a digital signal supplied from the signal generation processing unit 11 into an analog signal. The transmission DAC 21 may include a general digital-to-analog converter. The analog signal obtained by the transmission DAC 21 is supplied to the transmission circuit 22. Thus, the transmission DAC 21 may be coupled to the transmission circuit 22.

The transmission circuit 22 has a function of converting the analog signal obtained by the transmission DAC 21 into an intermediate frequency (IF) band. The transmission circuit 22 may include a general IF-band transmission circuit. The signal processed by the transmission circuit 22 is supplied to the RF transmission circuit 23. Thus, the transmission circuit 22 may be coupled to the RF transmission circuit 23.

The RF transmission circuit 23 has a function of transmitting the signal processed by the transmission circuit 22, as an RF wave such as a millimeter wave, for example. The RF transmission circuit 23 may include, for example, a general millimeter-wave transmission circuit. The signal processed by the RF transmission circuit 23 is supplied to the transmission antenna array 24. Thus, the RF transmission circuit 23 may be coupled to the transmission antenna array 24. The signal processed by the RF transmission circuit 23 is also supplied to the mixer 32. Thus, thus, the RF transmission circuit 23 may also be coupled to the mixer 32.

The transmission antenna array 24 includes a plurality of transmission antennas arranged in an array shape. FIG. 2 illustrates the configuration of the transmission antenna array 24 in a simplified manner. The transmission antenna array 24 transmits the signal processed by the RF transmission circuit 23 to outside of the electronic device 1. The transmission antenna array 24 may include a transmission antenna array used in a general millimeter-wave radar.

As described above, the electronic device 1 according to the one embodiment includes the transmission antenna array 24 and is capable of transmitting a transmission signal (for example, a transmission chirp signal) as a transmission wave from the transmission antenna array 24.

For example, suppose that the object 200 is present around the electronic device 1 as illustrated in FIG. 2. In this case, at least part of the transmission wave transmitted from the transmission antenna array 24 is reflected off the object 200. The at least part of the transmission wave transmitted from the transmission antenna array 24 and reflected off the object 200 may be reflected toward the reception antenna array 31.

The reception antenna array 31 receives a reflected wave. The reflected wave may be the at least part of the transmission wave transmitted from the transmission antenna array 24 and reflected off the object 200.

The reception antenna array 31 includes a plurality of reception antennas arranged in an array shape. FIG. 2 illustrates the configuration of the reception antenna array 31 in a simplified manner. The reception antenna array 31 receives a reflected wave that is the reflected transmission wave transmitted from the transmission antenna array 24. The reception antenna array 31 may include a reception antenna array used in a general millimeter-wave radar. The reception antenna array 31 supplies a reception signal received as the reflected wave to the mixer 32. Thus, the reception antenna array 31 may be coupled to the mixer 32.

Figure 3:
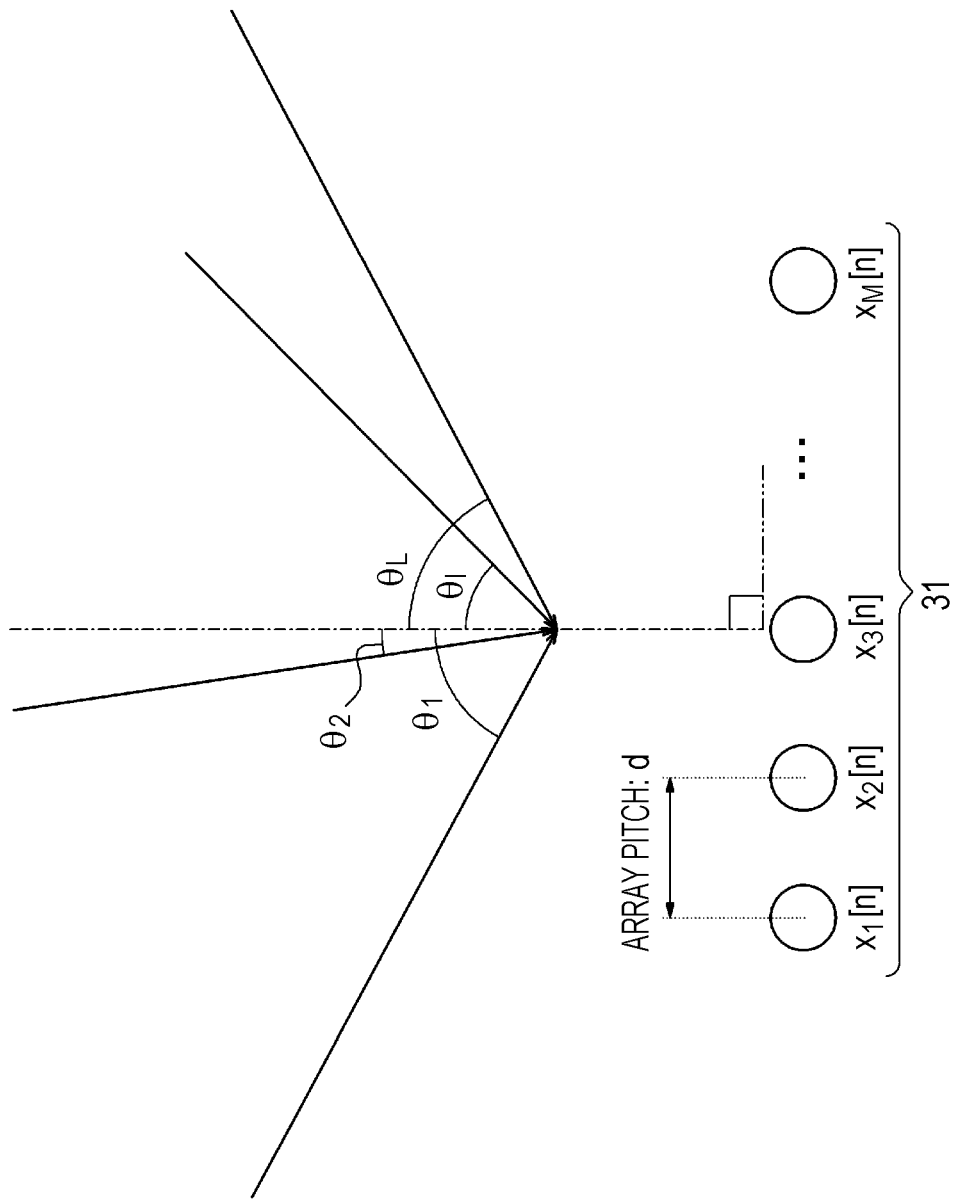
FIG. 3 is a functional block diagram schematically illustrating a configuration of an antenna array of the electronic device according to the one embodiment.

FIG. 3 is a diagram for describing how the reception antenna array 31 receives a radio wave. As illustrated in FIG. 3, the reception antenna array 31 may include sensors such as reception antennas arranged in a straight line. FIG. 3 illustrates the reception antenna array 31 as a plurality of antennas such as antennas $x_1$, $x_2$, $x_3$, . . . , $x_m$ that are represented by small circles. The reception antenna array 31 may include a plurality of antennas. As illustrated in FIG. 3, the plurality of antennas of the reception antenna array 31 are arranged at intervals of an array pitch d. As described above, a sensor array in which sensors (antennas, ultrasonic transducers, microphones, or the like) corresponding to various physical waves are arranged in an array shape is also referred to as a uniform linear array (ULA). As illustrated in FIG. 3, the physical waves (such as electromagnetic waves or sound waves) arrive from various directions such as $\theta_1$ and $\theta_2$, for example. $\theta_1$ and $\theta_2$ may be the angles of arrival described above. The sensor array such as the reception antenna array 31 can estimate a direction of arrival (angle of arrival) by using a phase difference caused between measured values of the sensors in accordance with the directions of arrival of the physical waves in direction-of-arrival estimation (angle-of-arrival estimation) in which such a phase difference is caused.

In one embodiment, the plurality of reception antennas may be arranged in a straight line to form the reception antenna array 31 as illustrated in FIG. 3.

The mixer 32 illustrated in FIG. 2 converts the signal (transmission signal) processed by the RF transmission circuit 23 and the reception signal received by the reception antenna array 31 into the intermediate-frequency (IF) band. The mixer 32 may include a mixer used in a general millimeter-wave radar. The mixer 32 supplies a signal generated as a result of composition to the reception circuit 33. Thus, the mixer 32 may be coupled to the reception circuit 33.

The reception circuit 33 has a function of performing analog processing on the IF-band signal obtained by the mixer 32 through the conversion. The reception circuit 33 may include a general reception circuit that performs conversion into the IF-band. The signal processed by the reception circuit 33 is supplied to the reception ADC 34. Thus, the reception circuit 33 may be coupled to the reception ADC 34.

The reception ADC (analog-to-digital converter) 34 has a function of converting the analog signal supplied from the reception circuit 33 into a digital signal. The reception ADC 34 may include a general analog-to-digital converter. The digitized signal obtained by the reception ADC 34 is supplied to the reception signal processing unit 12 of the signal processing unit 10. Thus, the reception ADC 34 may be coupled to the signal processing unit 10.

The reception signal processing unit 12 of the signal processing unit 10 has a function of performing various kinds of processing on the digital signal supplied from the reception ADC 34. For example, the reception signal processing unit 12 calculates (measures) a distance from the electronic device 1 to the object 200 on the basis of the digital signal supplied from the reception ADC 34. The reception signal processing unit 12 calculates (measures) a relative velocity of the object 200 with respect to the electronic device 1 on the basis of the digital signal supplied from the reception ADC 34. The reception signal processing unit 12 calculates (measures) an azimuth of the object 200 with respect to the electronic device 1 on the basis of the digital signal supplied from the reception ADC 34. Specifically, data resulting from I/Q conversion may be input to the reception signal processing unit 12. In response to input of such data, the reception signal processing unit 12 performs fast Fourier transform (2D-FFT) in a distance (range) direction and in a velocity direction. Then, the reception signal processing unit 12 performs processing of UART (Universal Asynchronous Receiver Transmitter) and/or CFAR (Constant False Alarm Rate) to remove noise points. In this manner, the reception signal processing unit 12 suppresses false alarms and makes a false alarm probability constant. Then, the reception signal processing unit 12 performs angle-of-arrival estimation on points satisfying the CFAR criterion to obtain the position of the object 200. Information generated as a result of range, velocity, and angle measurement performed by the reception signal processing unit 12 is supplied to the communication interface 13.

The communication interface 13 of the signal processing unit 10 includes an interface that outputs the information obtained in the signal processing unit 10 to an external control unit 50, for example. The communication interface 13 outputs information of at least any of the position, the velocity, and the angle of the object 200 as, for example, a signal of CAN (Controller Area Network) or the like to outside of the signal processing unit 10. The information of at least any of the position, the velocity, and the angle of the object 200 is supplied to the control unit 50 through the communication interface 13. Thus, the communication interface 13 may be coupled to the signal processing unit 10.

As illustrated in FIG. 2, the electronic device 1 according to the one embodiment may be coupled to, for example, the control unit 50 such as an ECU (Electronic Control Unit) with a cable or wirelessly. The control unit 50 controls various operations of the mobility device 100. The control unit 50 may be constituted by at least one or more ECUs.

Figure 4:
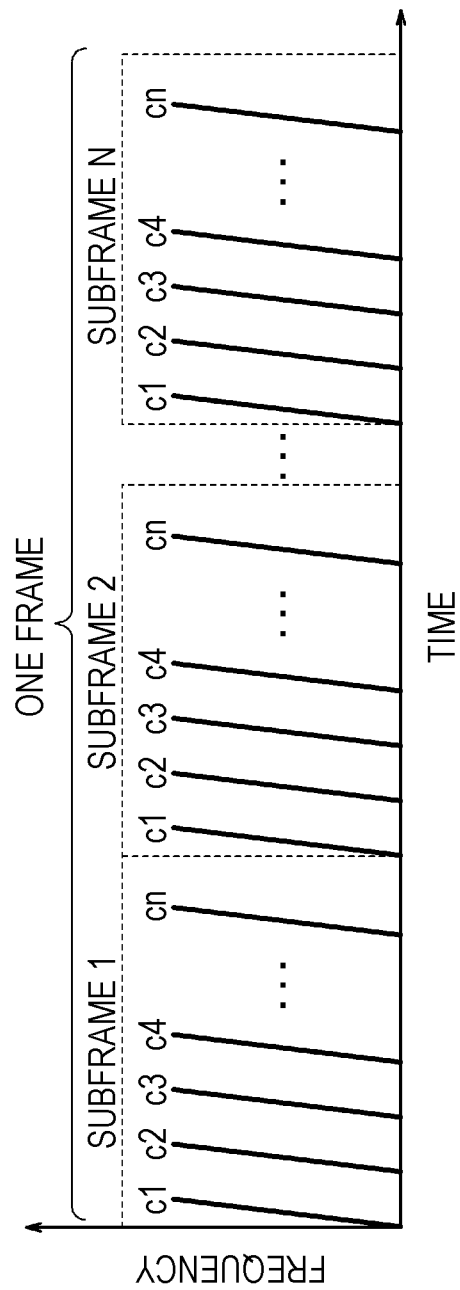
FIG. 4 is a diagram for describing a configuration of a signal processed by the electronic device according to the one embodiment.

FIG. 4 is a diagram for describing an example of chirp signals generated by the signal generation processing unit 11 of the signal processing unit 10.

FIG. 4 illustrates a structure of one frame with respect to time when an FCM (Fast-Chirp Modulation) scheme is used. FIG. 4 illustrates an example of a reception signal according to the FCM scheme. The FCM is a scheme in which chirp signals denoted by c1, c2, c3, c4, . . . , cn in FIG. 4 are repeated at short intervals (equal to or greater than a time, taken for a round trip of an electromagnetic wave between the radar and the object, calculated from the maximum measured distance, for example). In the FCM, for convenience of signal processing of the reception signal, the signal is often divided in units of subframes illustrated in FIG. 4 to perform transmission/reception processing.

In FIG. 4, the horizontal axis represents elapsed time and the vertical axis represents a frequency. In the example illustrated in FIG. 4, the signal generation processing unit 11 generates linear chirp signals whose frequency changes linearly and periodically. In FIG. 4, the individual chirp signals are denoted by c1, c2, c3, c4, . . . , cn. As illustrated in FIG. 4, the frequency of each chirp signal linearly increases as time elapses.

In the example illustrated in FIG. 4, one subframe includes several chirp signals c1, c2, c3, c4, . . . , cn. That is, each of subframes such as a subframe 1 and a subframe 2 illustrated in FIG. 4 includes several chirp signals c1, c2, c3, c4, . . . , cn. In the example illustrated in FIG. 4, one frame (single frame) includes several subframes such as the subframes 1, 2, . . . , N. That is, one frame illustrated in FIG. 4 includes N subframes. The one frame illustrated in FIG. 4 may serve as a frame 1, which may be followed by a frame 2, frame 3, and so on. Similarly to the frame 1, each of these frames may include N subframes. A frame interval of a predetermined length may be included between frames. One frame illustrated in FIG. 4 may have a length of about 30 ms to 50 ms, for example.

In the electronic device 1 according to the one embodiment, the signal generation processing unit 11 may generate a transmission signal as any number of frames. In FIG. 4, an illustration of some chirp signals is omitted. As described above, a relationship between time and a frequency of the transmission signal generated by the signal generation processing unit 11 may be stored in the storage unit or the like of the signal processing unit 10, for example.

As described above, the electronic device 1 according to the one embodiment may transmit a transmission signal constituted by subframes each including a plurality of chirp signals. The electronic device 1 according to the one embodiment may transmit a transmission signal constituted by frames each including a predetermined number of subframes.

Description is given below on the assumption that the electronic device 1 transmits a transmission signal having a frame structure illustrated in FIG. 4. However, the frame structure illustrated in FIG. 4 is an example. For example, any number of chirp signals may be included in one subframe. That is, in one embodiment, the signal generation processing unit 11 may generate a subframe including any number (for example, a plurality) of chirp signals. The subframe structure illustrated in FIG. 4 is also an example. For example, any number of subframes may be included in one frame. That is, in one embodiment, the signal generation processing unit 11 may generate a frame including any number (for example, a plurality) of subframes. The signal generation processing unit 11 may generate signals having different frequencies. The signal generation processing unit 11 may generate a plurality of discrete signals of bandwidths in which frequencies f are different from each other.

Figure 5:
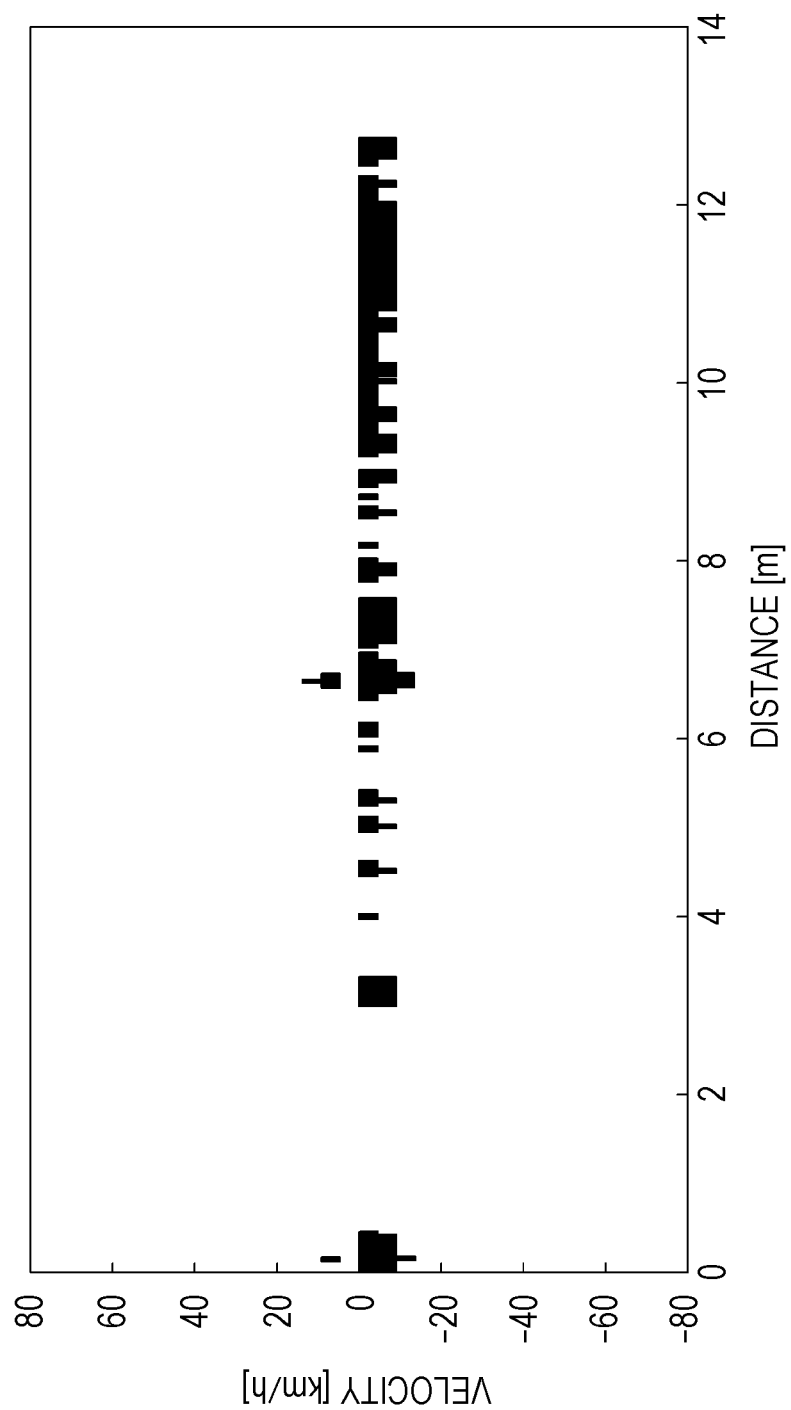
FIG. 5 is a diagram illustrating an example of processing of the signal performed by the electronic device according to the one embodiment.

FIG. 5 is a diagram illustrating an example of a result obtained by performing the CFAR processing described above.

The result illustrated in FIG. 5 indicates an example obtained when the received time-series signal is converted into I/Q data, 2D-FFT (Two Dimensional Fast Fourier Transform) is performed on the I/Q data, and then the CFAR processing is performed. That is, FIG. 5 is a diagram illustrating an example in which a point cloud is calculated in a range-Doppler (distance-velocity) plane as a result of the reception signal processing unit 12 illustrated in FIG. 2 performing 2D-FFT, CFAR, and integrated signal processing of the subframes. In FIG. 5, the horizontal direction represents a range (distance) and the vertical direction represents a velocity. The point cloud illustrated in FIG. 5 is a point cloud representing signals that exceed CFAR threshold processing.

Next, prior to description of direction-of-arrival estimation performed by the electronic device 1 according to the one embodiment, a current state of direction-of-arrival estimation performed by a general millimeter-wave radar is described first. The description below is given on the assumption that the direction of arrival of a received radio wave is estimated by using the reception antenna array 31 illustrated in FIG. 3. In the direction-of-arrival estimation, formulation can be performed in the following manner. In Expressions below, characters representing a vector or a matrix may be illustrated as bold characters. However, herein, when a vector or a matrix is represented by text, the text may be sometimes illustrated as normal characters instead of bold characters.

Each of signals received by the respective reception antennas $x_1, x_2, x_3, \ldots, x_m$ of the reception antenna array 31 is a vector with respect to time. The number of samples (number of snapshots) of the signal is denoted by N. The number of reception antennas of the reception antenna array 31 is denoted by M. The number of signals in the direction of arrival is denoted by L. A reception signal of an m-th reception antenna in a snapshot n is denoted by $x_m[n]$ (where 1 ? n? N, 1 ? m? M). A true reception signal complex amplitude in the snapshot n of an l-th signal source (1 ? 1 ? L) is denoted by $s_l[n]$. Then, vectors x[n] and s[n] obtained by arraying $x_m[n]$ and $s_l[n]$ are represented by Expression (1) below by using an array manifold matrix A that represents directions of respective signal sources and by using a noise vector v[n].

[Math. 1]

$$x[n]=As[n]+v[n] \quad (1)$$

In Expression (1) above, the vector x[n], the vector s[n], the matrix A, and the vector v[n] can be represented by Expressions (2) to (6) below.

[Math. 2]
$$x[n] = [x_1[n], x_2[n], \ldots, x_M[n]]^T \quad (2)$$

[Math. 3]
$$s[n] = [s_1[m], s_2[m], \ldots, s_M[m]]^T \quad (3)$$

[Math. 4]
$$A = [a[\theta_1], a[\theta_2], \ldots, a[\theta_L]] \quad (4)$$

[Math. 5]
$$a[\theta_l] = \left[1, e^{-j\frac{2\pi}{\lambda}d\sin\theta_l}, \ldots, e^{-j\frac{2\pi}{\lambda}(M-1)d\sin\theta_l}\right]^T \quad (5)$$

[Math. 6]
$$v[n] = [v_1[n], v_2[n], \ldots, v_M[n]]^T \quad (6)$$

In the above, all the signals $S_l[n]$ are uncorrelated.

In general, when the direction of arrival of a sound wave or an electromagnetic wave is estimated, for example, a method using a beamformer and a subspace method may be used. The method using a beamformer is a method of searching for an incoming wave while sequentially changing an array manifold vector $a[\theta_l]$. The subspace method is a method of searching for an incoming wave by examining structures of an eigenspace and a subspace of a variance-covariance matrix R of the observed value vector x[n]. MUltiple SIgnal Classification (MUSIC), Estimation of Signal Parameters via Rotational Invariance Technique (ESPRIT), and the like are representative methods of the subspace method.

Types of MUSIC include Spectrum-MUSIC based on a search of a MUSIC spectrum, Root-MUSIC for obtaining a direction estimation solution through algebraic calculation by z-transforming the MUSIC array manifold vector, and so on.

ESPRIT is a method of dividing the entire array into two sub-arrays and using a subspace method.
Types of ESPRIT include several methods depending on the type of the solution of the least squares method. In general, Total Least Square ESPRIT (TLS-ESPRIT) in which the least square error is smallest is often used.

The method using a beamformer is a method of estimating a direction of arrival by using a peak subjected to beam-forming. On the other hand, the subspace method is a search using a null point of directivity because the method is based on a process of minimizing energy received from an incoming wave. Since the null point is much smaller in width than the peak value of the beamformer, the subspace method is much superior in terms of angular resolution. Thus, the subspace method tends to be used more often in applications such as radar or sonar.

With the subspace method, a good calculation result can be obtained in terms of angular resolution. In the subspace method, as the number of sensors M and the number of snapshots N are increased, the accuracy and precision of direction-of-arrival estimation can be increased. Conversely, when the number of sensors M and the number of snapshots N are small, the accuracy and precision of the direction-of-arrival estimation decrease. Consequently, an estimated solution different from the true direction of arrival may be calculated. This error is explicitly indicated in the variance-covariance matrix.

A matrix X in which as many observed value vectors x[n] as the number of snapshots are arranged in the row direction is defined as represented by Expression (7) below.

[Math. 7]

$$X=[x[1],x[2],\ldots,x[N]] \tag{7}$$

In this case, the variance-covariance matrix R of the observed value vector x[n] is calculated as represented by Expression (8) below by using Expression (1). In Expression (8), the noise vector v[n] is assumed to be Gaussian. In Expression (8), the number of snapshots is infinite. That is, an asymptotic condition in the case of N→∞ is assumed.

[Math. 8]

$$R = \frac{1}{N}XX^H = ASA^H + \sigma^2 I \tag{8}$$

In Expression (8) above, H denotes the Hermitian transpose. The variance-covariance matrix R of Expression (8) above can also be expressed as Expression (9) below.

[Math. 9]

$$R = \begin{bmatrix} E[x_1 x_1^*] & E[x_1 x_2^*] & \ldots & E[x_1 x_M^*] \\ E[x_2 x_1^*] & E[x_2 x_2^*] & \ldots & E[x_2 x_M^*] \\ \vdots & \vdots & \ddots & \vdots \\ E[x_M x_1^*] & E[x_M x_2^*] & \ldots & E[x_M x_M^*] \end{bmatrix} \tag{9}$$

In Expression 9 above, $E[x_j x_k^*]$ denotes an expected value of the product of outputs of j-th and k-th reception antennas. In $E[x_j x_k^*]$, "*" at the upper right position represents the complex conjugate.

The variance-covariance matrix R of Expression (9) above can also be expressed as Expression (10) below.

[Math. 10]

$$R = \begin{bmatrix} \frac{\sigma^2}{N}+L & \sum_{l=1}^{L} e^{-j\frac{2\pi}{\lambda}d\sin\theta_l} & \ldots & \sum_{l=1}^{L} e^{-j(M-1)\frac{2\pi}{\lambda}d\sin\theta_l} \\ \sum_{l=1}^{L} e^{j\frac{2\pi}{\lambda}d\sin\theta_l} & \frac{\sigma^2}{N}+L & \ldots & \sum_{l=1}^{L} e^{-j(M-2)\frac{2\pi}{\lambda}d\sin\theta_l} \\ \vdots & \vdots & \ddots & \vdots \\ \sum_{l=1}^{L} e^{j(M-1)\frac{2\pi}{\lambda}d\sin\theta_l} & \sum_{l=1}^{L} e^{j(M-2)\frac{2\pi}{\lambda}d\sin\theta_l} & \ldots & \frac{\sigma^2}{N}+L \end{bmatrix}$$

(10)

In the case of noise σ=0, the rank of the variance-covariance matrix R matches the number of signal sources L. Thus, rank(R)=L holds.

In the MUSIC method, the eigenspace of the variance-covariance matrix R is examined. The MUSIC method uses the fact that the noise subspace in the eigenspace of the variance-covariance matrix R is orthogonal to the array manifold vector $a[\theta_l]$. The noise subspace in the eigenspace of the variance-covariance matrix R is a space spanned by (M–L) eigenvectors whose eigenvalues are approximately equal to noise $\sigma^2$. In this way, in the MUSIC method, the direction of arrival is estimated while calculating the MUSIC spectrum and searching for the peak.

A matrix $E_n$ in which (M–L) basis vectors that span the noise subspace are arranged is defined by Expression (11) below.

[Math. 11]

$$E_n=[e_{L+1},\ldots,e_M] \tag{11}$$

In Expression (11) above, a vector $e_m$ is an m-th eigenvector.

From the orthogonality of the noise subspace and the array manifold vector, a MUSIC spectrum function to be maximized in the direction-of-arrival estimation is defined as Expression (12) below.

[Math. 12]

$$P[\theta_l] = \frac{a^H[\theta_l]a[\theta_l]}{a^H[\theta_l]E_n E_n^H a[\theta_l]} \tag{12}$$

In general, with a processing capability of a CPU or a DSP mounted in a device required to perform edge processing, the calculation cost of the peak search increases. Accordingly, the Root-Music method is used as a method of algebraically performing calculation similar to this calculation.

The Root-MUSIC method of Expression (10) is described below. In the Root-MUSIC method, the MUSIC spectrum described above is z-transformed to be algebraic calculation.

The z-transform $a_z$ of the array manifold vector $a[\theta_1]$ of Expression (5) is defined as Expression (13) below.

[Math. 13]

$$a_z=[1,z,\ldots,z^{M-1}]^T \tag{13}$$

That is, z is replaced as indicated by Expression (14) below, and then a factor $z^{(-(M-1)/2)}$ is divided. In this manner, the z-transform of the array manifold vector of Expression (13) is defined.

[Math. 14]

$$z = e^{-j\frac{2\pi}{\lambda}d\sin\theta_l} \tag{14}$$

In the Root-MUSIC method, a solution of direction estimation can be obtained by solving a high-order algebraic equation of z that makes the denominator of Expression (12) above of the MUSIC spectrum zero. This high-order equation called Root-MUSIC Polynomial (RMP) can be represented as Expression (15) below.

[Math. 15]

$$z^{M-1}a_z^H E_n E_n^H a_z = [z^{M-1}, \ldots, z, 1] E_n E_n^H [1, z, \ldots, z^{M-1}]^T = 0 \quad (15)$$

According to Expression (15) above, the solution of the RMP needs to satisfy $|z|=1$. However, in practice, the solution does not satisfy $|z|=1$ because of various observation errors and perturbations. Thus, a value close to a unit circle in a z-plane is adopted as the solution.

Eventually, an l-th angle of arrival $\theta_l$ can be calculated as indicated by Expression (16) below from the solution obtained by solving the RMP of Expression (15) above. In Expression (16), the angle of arrival $\theta$ denotes a calculated value (estimated value).

[Math. 16]

$$\theta_l = \sin^{-1}\left(\frac{\lambda}{2\pi d} \arg z_l\right) \quad (16)$$

In actual direction-of-arrival estimation, a circumstance is probable where the number of snapshots is limited to be small and the number of sensors such as the reception antennas of the reception antenna array 31 is also small. In actual direction-of-arrival estimation, noise may be non-Gaussian. When the directivity of each sensor is narrow, the signal intensity of a signal arriving from a wide-angle side becomes small. Consequently, a signal-to-noise ratio (S/N ratio) may become relatively small.

In the above case, the variance-covariance matrix R may no longer conform to the forms indicated by Expressions (8) to (10) above. This may become a cause that greatly decreases the accuracy and precision of the direction-of-arrival estimation. In this case, when the perturbation is expressed in the form of the factor, the covariance matrix is formulated to be Expression (17) below.

[Math. 17]

$$R = \begin{bmatrix} \Delta_1 & \sum_{l=1}^{L} \delta_{12}^l e^{-j\frac{2\pi}{\lambda}d\sin\theta_l} & \cdots & \sum_{l=1}^{L} \delta_{1M}^l e^{-j(M-1)\frac{2\pi}{\lambda}d\sin\theta_l} \\ \sum_{l=1}^{L} \delta_{12}^l {}^* e^{-j\frac{2\pi}{\lambda}d\sin\theta_l} & \Delta_2 & \cdots & \sum_{l=1}^{L} \delta_{2M}^l e^{-j(M-2)\frac{2\pi}{\lambda}d\sin\theta_l} \\ \vdots & \vdots & \ddots & \vdots \\ \sum_{l=1}^{L} \delta_{1M}^l {}^* e^{-j(M-1)\frac{2\pi}{\lambda}d\sin\theta_l} & \sum_{l=1}^{L} \delta_{2M}^l {}^* e^{-j(M-2)\frac{2\pi}{\lambda}d\sin\theta_l} & \cdots & \Delta_M \end{bmatrix} \quad (17)$$

$\Delta_j$ is assumed to satisfy a condition of Expression (18) below.

[Math. 18]

$$\Delta_j = E[x_j x_j^*] \in \mathbb{R} \, (1 \le j \le M) \quad (18)$$

In Expression (17) above, the factor representing the perturbation for the product of the j-th and k-th sensors with respect to the l-th signal source is represented by Expression (19) below.

[Math. 19]

$$\delta_{jk}^l \in \mathbb{C} \, (1 \le j \le M, 1 \le k \le M, 1 \le l \le L) \quad (19)$$

In the present disclosure, a case is assumed where the number of sensors such as reception antennas of the reception antenna array 31 is markedly small. Herein, a case is described where the number of reception antennas M of the reception antenna array 31 is 2. In this case, the number of signals that can be estimated is 1 (L=1). In the above case, Expression (17) above can be expressed as Expression (20) below.

[Math. 20]

$$R = \begin{bmatrix} \Delta_1 & \delta_{12} e^{-j\frac{2\pi}{\lambda}d\sin\theta_l} \\ \delta_{12}^* e^{j\frac{2\pi}{\lambda}d\sin\theta_l} & \Delta_2 \end{bmatrix} \quad (20)$$

In the subspace method, the noise subspace of the variance-covariance matrix R is determined, and calculation using the orthogonality with the array manifold vector $a[\theta_1]$ is performed. In ESPRIT, a calculation process includes division into sub-arrays but the same and/or similar idea can be employed. A calculation error in the noise subspace leads to a decrease in the accuracy and precision of the direction estimation.

Accordingly, when performing signal processing using the Root-MUSIC method, the electronic device 1 according to the one embodiment does not obtain an erroneous direction estimation solution from the variance-covariance matrix R affected by the perturbation represented by Expression (11) above. The following description is given, assuming that M=2, that is, the number of reception antennas of the reception antenna array 31 is small when the electronic device 1 according to the one embodiment performs direction-of-arrival estimation.

When the number of reception antennas of the reception antenna array 31 satisfies M=2, Expression (10) above can be expressed as Expression (20) above. Since the RMP represented by Expression (15) above has one noise eigenspace basis vector, the RMP can be represented by Expression (21) below using a component of $E_n = e_1 = [e_{11} e_{12}]^T$.

[Math. 21]

$$e_1 e_2 z^2 + (e_1 e_1^* + e_2 e_2^*) z + e_2 e_1^* = 0 \quad (21)$$

The solution of Expression (21) above is represented by Expression (22) below. In Expression (22), $z_1$ denotes a calculated value (estimated value).

[Math. 22]

$$z_l = -\frac{e_{12}}{e_{11}}, \frac{e_{11}^*}{e_{12}^*} \quad (22)$$

The solution of Expression (22) above can be classified depending on whether the solution is located inside or outside a unit circle in the complex plane. The solution located inside the unit circle, that is, the solution having a small absolute value is adopted as the solution of the RMP. By substituting the component of the eigenvector calculated from Expression (20) above into Expression (22) above, the solution of the RMP is calculated with the perturbation included as indicated by Expression (23) below. Also in Expression (23), $z_l$ denotes a calculated value (estimated value).

[Math. 23]

$$z_l = -\frac{2\delta_{12}\delta_{12}^* e^{j\frac{2\pi}{\lambda}d\sin\theta_l}}{\Delta_1 - \Delta_2 - \sqrt{(\Delta_1 - \Delta_2)^2 + 4(\delta_{12}\delta_{12}^*)^2}}, \tag{23}$$

$$-\frac{\Delta_1 - \Delta_2 - \sqrt{(\Delta_1 - \Delta_2)^2 + 4(\delta_{12}\delta_{12}^*)^2}}{2\delta_{12}\delta_{12}^* e^{-j\frac{2\pi}{\lambda}d\sin\theta_l}}$$

When the diagonal of the variance-covariance matrix R asymptotically approaches the same value as in Expression (10) above, Expression (24) below holds in Expression (23) above. Thus, Expression (23) above asymptotically approaches a phase factor of the array manifold vector corresponding to the direction of arrival of the signal.

[Math. 24]

$$\lim_{\Delta_1\Delta_2 \to 0} z_l = e^{-j\frac{2\pi}{\lambda}d\sin\theta_l} \tag{24}$$

Figure 6:
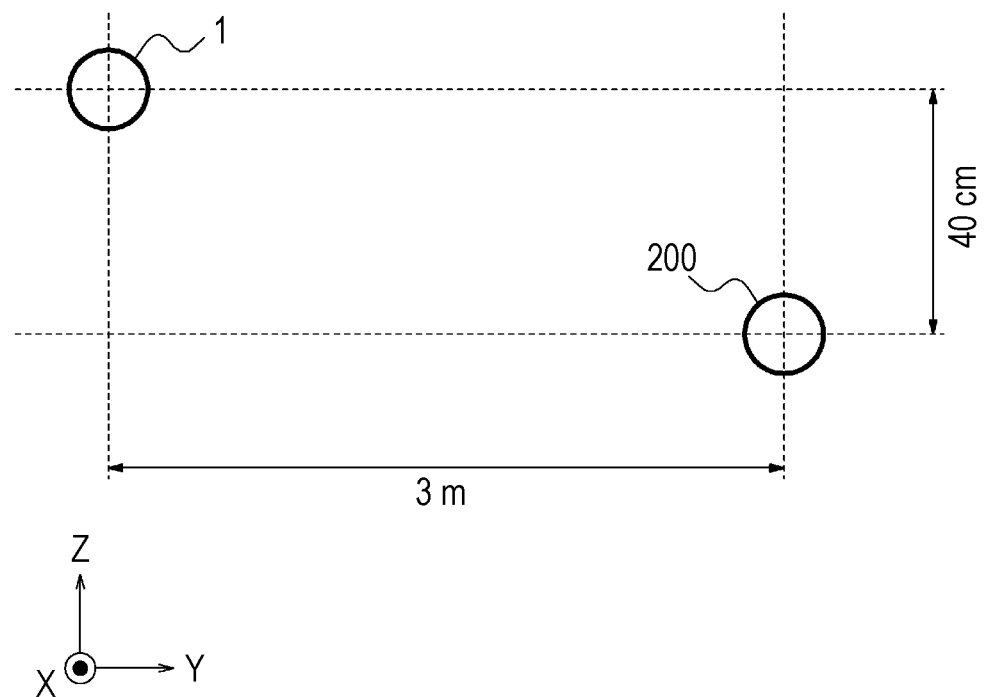
FIG. 6 is a diagram illustrating an example of an arrangement of the electronic device according to the one embodiment.

FIG. 6 is a diagram illustrating an example of an actual positional relationship between the electronic device 1 according to the one embodiment and the object 200. A case is described below where the electronic device 1 detects the object 200 in the positional relationship illustrated in FIG. 6. The electronic device 1 illustrated in FIG. 6 may be installed in a front portion of the mobility device 100 similarly to the state illustrated in FIG. 1, for example. As illustrated in FIG. 6, the electronic device 1 may be installed in the front portion of the mobility device 100 at a position above the ground by 40 cm. As illustrated in FIG. 6, the object 200 is located at a position in front of the electronic device 1 by 3 m. FIG. 6 illustrates the positional relationship between the electronic device 1 and the object 200 as a simplified diagram. The position of the electronic device 1 may be, for example, a position where the transmission antenna array 24 and/or the reception antenna array 31 are/is installed.

Hereinafter, the electronic device 1 is assumed to be a millimeter-wave radar using chirp signals. An example case is presented where the electronic device 1 performs vertical-direction angle-of-arrival estimation when the number of reception antennas (the number of sensors) of the reception antenna array 31 satisfies M=2. The half-width of the vertical-direction directivity of the reception antennas of the reception antenna array 31 is about ±14 degrees.

Figure 7:
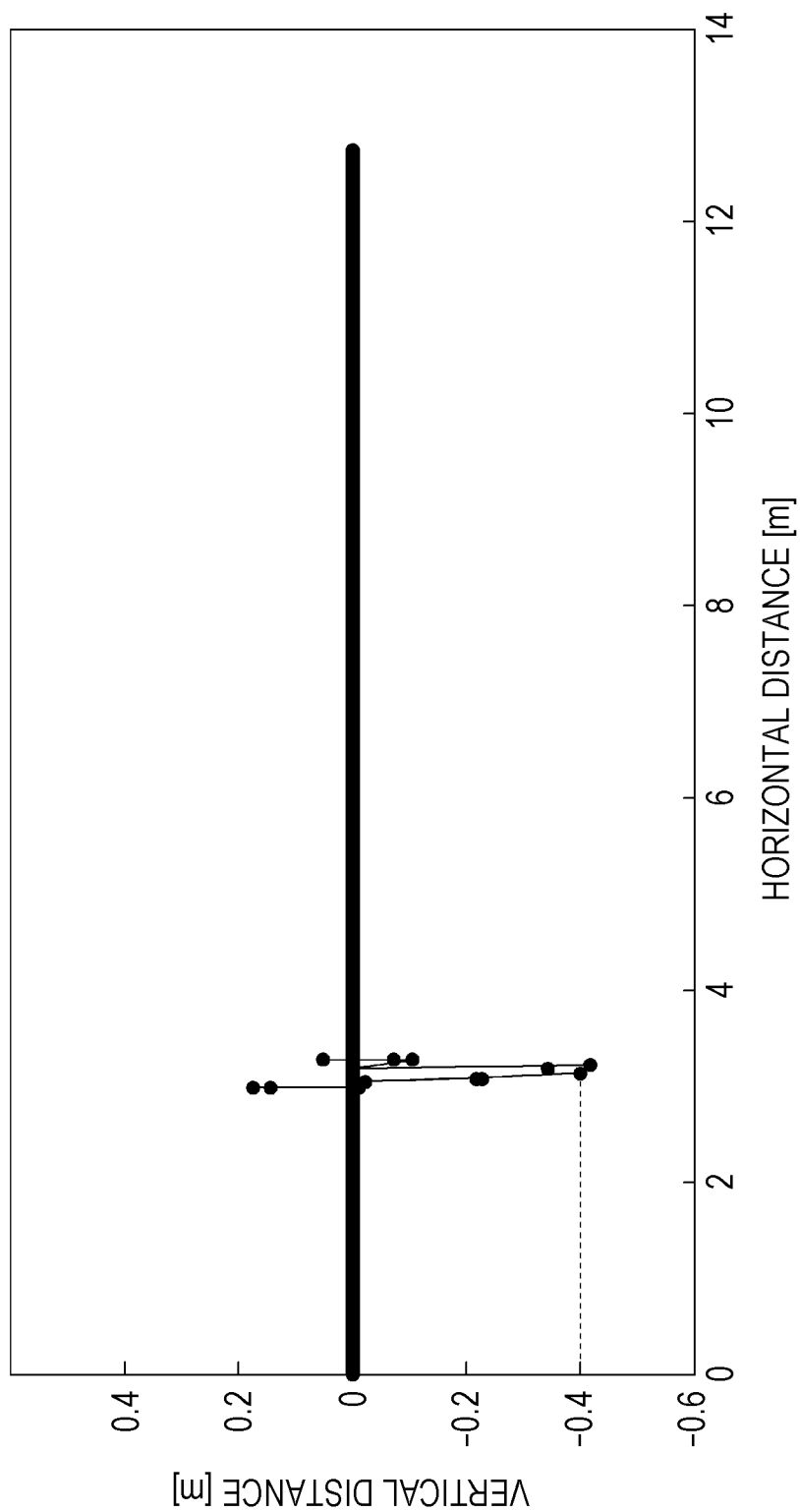
FIG. 7 is a diagram illustrating an example of processing of the signal performed by the electronic device according to the one embodiment.

FIG. 7 is a diagram illustrating an example case where the object 200 is detected in the circumstance illustrated in FIG. 6. FIG. 7 illustrates an example displaying a point cloud representing the object 200 in the circumstance illustrated in FIG. 6. As illustrated in FIG. 7, the point cloud is plotted at a position around −40 cm that is the actual vertical position of the object 200. On the other hand, as illustrated in FIG. 7, the point cloud is also plotted at many positions different from the position around −40 cm that is the actual vertical position of the object 200. As described above, when the number of antennas is as small as two (M=2), the perturbation represented by Expression (23) above increases because the directivity of the reception antennas is narrow as well. For this reason, as illustrated in FIG. 7, many erroneously detected points are output at the vertical positions. For example, in the example illustrated in FIG. 7, in addition to the position near −40 cm (near the horizontal position of 3 m) that is the actual vertical position of the object 200, many erroneously detected points are output in a range from +20 cm to −40 cm.

In view of such a current circumstance, the electronic device 1 according to the one embodiment enables the angle of arrival to be accurately estimated even when the number of reception antennas of the reception antenna array 31 is relatively small. An operation of the electronic device 1 according to the one embodiment is further described below.

Figure 8:
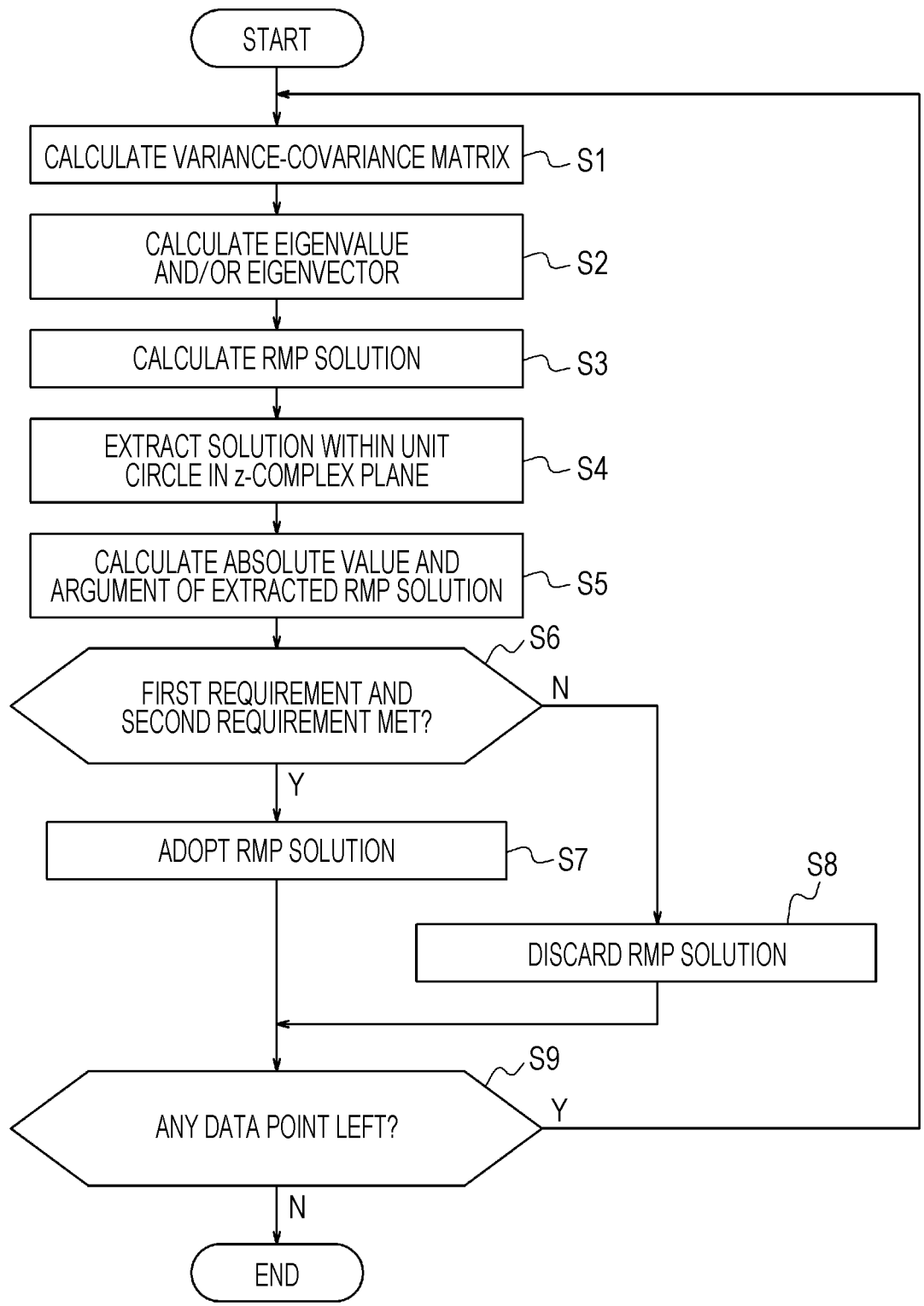
FIG. 8 is a flowchart for describing an operation of the electronic device according to the one embodiment.

FIG. 8 is a flowchart for describing the operation of the electronic device 1 according to the one embodiment. In one embodiment, the electronic device 1 defines requirements related to the positions of the calculated solutions of the RMP in the complex plane from two viewpoints and omits solutions not satisfying these requirements. In this manner, the electronic device 1 performs signal processing so that the occurrence of erroneously detected points is prevented. The requirements defined, from the two viewpoints, for the signal processing performed by the electronic device 1 according to the one embodiment are also referred to as a first requirement and a second requirement below. The operation of the electronic device 1 according to the one embodiment illustrated in FIG. 8 may be performed by the reception signal processing unit 12 of the signal processing unit 10. The operation of the electronic device 1 according to the one embodiment is described below.

In response to the start of the operation illustrated in FIG. 8, the signal processing unit 10 of the electronic device 1 calculates the variance-covariance matrix R in the manner as described above (step S1). In step S1, the signal processing unit 10 may calculate the variance-covariance matrix R for a certain data point (one point in the point cloud).

After calculating the variance-covariance matrix R in step S1, the signal processing unit 10 calculates an eigensystem (eigenvalue/eigenvector) of the variance-covariance matrix R (step S2).

After calculating the eigenvalue/eigenvector in step S2, the signal processing unit 10 calculates solutions of the RMP (step S3). When calculating the solutions of the RMP in step S3, the signal processing unit 10 extracts only solutions located inside the unit circle in the z-complex plane (step S4). That is, in steps S3 and S4, the signal processing unit 10 calculates solutions of the RMP and extracts only solutions located inside the unit circle in the z-complex plane.

After completing the processing in steps S3 and S4, the signal processing unit 10 calculates absolute values and arguments in the complex plane from the extracted solutions of the RMP (step S5).

After completing the calculation in step S5, the signal processing unit 10 determines whether the calculation result obtained in step S5 satisfies the first requirement and the second requirement (step S6). In step S6, the signal processing unit 10 determines whether the calculation result obtained in step S5 satisfies both the first requirement and the second requirement. The first requirement and the second requirement used in the determination in step S6 is further described later.

If the calculation result is determined to satisfy the first requirement and the second requirement in step S6, the signal processing unit 10 adopts this calculation result (satisfying the first requirement and the second requirement) (step S7). "Adopting the calculation result" may be, for example, outputting the calculation result satisfying the first requirement and the second requirement from the signal processing unit 10 (for example, the communication interface 13) as the result of the signal processing performed by the signal processing unit 10.

On the other hand, if the calculation result is determined to not satisfy at least one of the first requirement or the second requirement in step S6, the signal processing unit 10 rejects this calculation result (not satisfying at least one of the first requirement or the second requirement) (step S8). "Rejecting the calculation result" may be, for example, not outputting the calculation result not satisfying at least one of the first requirement or the second requirement from the signal processing unit 10 (for example, the communication interface 13) as the result of the signal processing performed by the signal processing unit 10. "Rejecting the calculation result" may be, for example, deleting (erasing) the calculation result not satisfying at least one of the first requirement or the second requirement from the storage unit of the signal processing unit 10. "Rejecting the calculation result" may be, for example, the signal processing unit 10 not performing signal processing on the calculation result not satisfying at least one of the first requirement or the second requirement.

After step S7 or step S8, the signal processing unit 10 determines whether an unprocessed data point is still present (step S9).

In step S9, if it is determined that no unprocessed data point is present, that is, if it is determined that the processing has been completed for all the data points, the signal processing unit 10 may end the process illustrated in FIG. 8. On the other hand, if it is determined in step S9 that an unprocessed data point is still present, the signal processing unit 10 may repeat the processing of step S1 and subsequent steps for the next point among the unprocessed data points.

The first requirement used in the determination in step S6 of FIG. 8 is described below.

First Requirement

When the signal processing unit 10 examines the solutions of the RMP in the z-complex plane in step S6 illustrated in FIG. 8, z≈1 is required from definition equations of the z-transform, that is, Expressions (13) and (14) above. In practice, the signal processing unit 10 determines whether or not the distance between a circumferential point of the unit circle and the solution of the RMP in the z-complex plane is equal to or less than a certain threshold. That is, when $z_i$ satisfies Expression (25) below, the signal processing unit 10 may determine that "the first requirement is satisfied".
[Math. 25]

$$r_{th} < \|z_i\| \leq 1 \tag{25}$$

$r_{th}$ is a threshold that defines the norm of $z_i$ and is a numerical value to be appropriately defined. $r_{th}$ is a numerical value that satisfies Expression (26) below.
[Math. 26]

$$r_{th} \in \mathbb{R} \tag{26}$$

Figure 9:
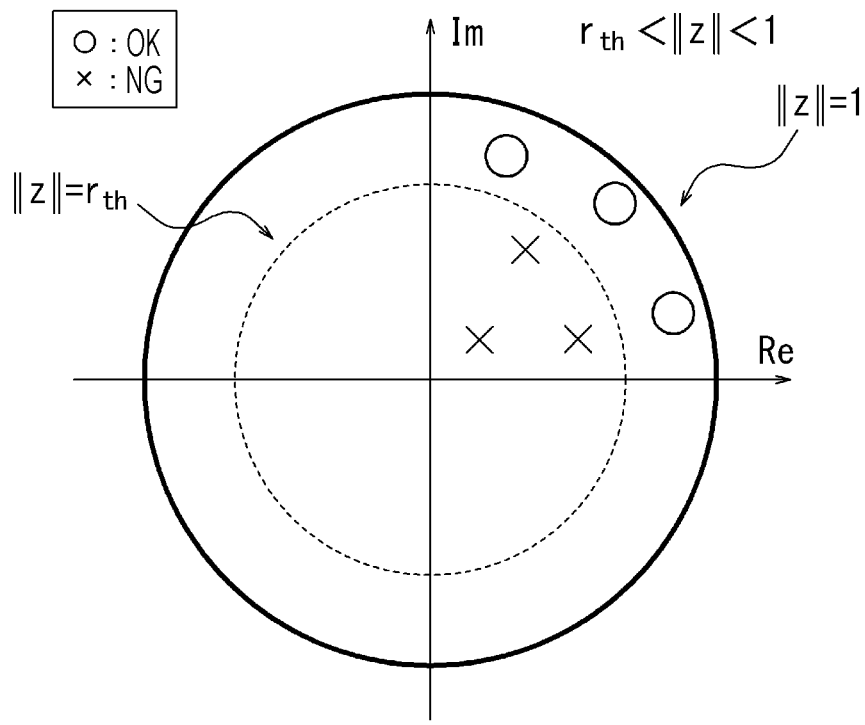
FIG. 9 is a diagram for describing processing of the signal performed by the electronic device according to the one embodiment.

FIG. 9 is a diagram illustrating a concept of the first requirement. FIG. 9 is a diagram illustrating an example of a state in which the solutions of the RMP are examined in the z-complex plane. In FIG. 9, the horizontal axis represents a real axis and the vertical axis represents an imaginary axis. In FIG. 9, a unit circle defined in the z-complex plane is indicated by a solid line, and a circle ($r_{th}$<1) having a radius of the predetermined threshold $r_{th}$ is indicated by a broken line. The solutions of the RMP denoted by circles in FIG. 9 satisfy Expression (25) above. Thus, the signal processing unit 10 may determine that the solutions of the RMP denoted by the circles in FIG. 9 "satisfy the first requirement". On the other hand, the solutions of the RMP denoted by crosses in FIG. 9 do not satisfy Expression (25) above. Thus, the signal processing unit 10 may determine that the solutions of the RMP denoted by the crosses in FIG. 9 "do not satisfy the first requirement".

The second requirement used in the determination in step S6 of FIG. 8 is described next.

Second Requirement

The two adjacent solutions of the RMP in the point cloud illustrated in a range-Doppler (distance-velocity) plane are to be adjacent to each other also in the z-complex plane. For this reason, the two adjacent solutions of the RMP in the z-complex plane satisfy at least one of Expression (27) or Expression (28) below. Thus, the signal processing unit 10 may determine that the two adjacent solutions $z_i$ and $z_{i-1}$ of the RMP "satisfy the second requirement" if the two adjacent solutions $z_i$ and $z_{i-1}$ satisfy at least one of Expression (27) or Expression (28) below.
[Math. 27]

$$\|z_i - z_{i-1}\| < n_{th} \tag{27}$$

[Math. 28]

$$\|\arg(z_i - z_{i-1})\| < \varphi_{th} \tag{28}$$

In Expression (27) above, $n_{th}$ is a threshold that defines a difference in norm between the adjacent solutions of the RMP and is a numerical value to be appropriately defined. $n_{th}$ is a numerical value that satisfies Expression (29) below.
[Math. 29]

$$n_{th} \in \mathbb{R} \tag{29}$$

In Expression (28) above, $\varphi_{th}$ is a threshold that defines a difference in argument between the adjacent solutions of the RMP and is a numerical value to be appropriately defined. $\varphi_{th}$ is a numerical value that satisfies Expression (30) below.
[Math. 30]

$$\varphi_{th} \in \mathbb{R} \tag{30}$$

As described above, for the second requirement, the two adjacent solutions $z_i$ and $z_{i-1}$ of the RMP may satisfy only at least one of Expression (27) or Expression (28). In the second requirement, when Expression (27) and Expression (28) are distinguished from each other, the requirement defined by Expression (27) is also referred to as a "second requirement (norm)" and the requirement defined by Expression (28) is also referred to as a "second requirement (argument)". That is, in one embodiment, when at least one of the second requirement (norm) or the second requirement (argument) is satisfied, the signal processing unit 10 may determine that "the second requirement is satisfied". In the one embodiment, when neither the second requirement (norm) nor the second requirement (argument) is satisfied, the signal processing unit 10 may determine that "the second requirement is not satisfied".

Figure 10:
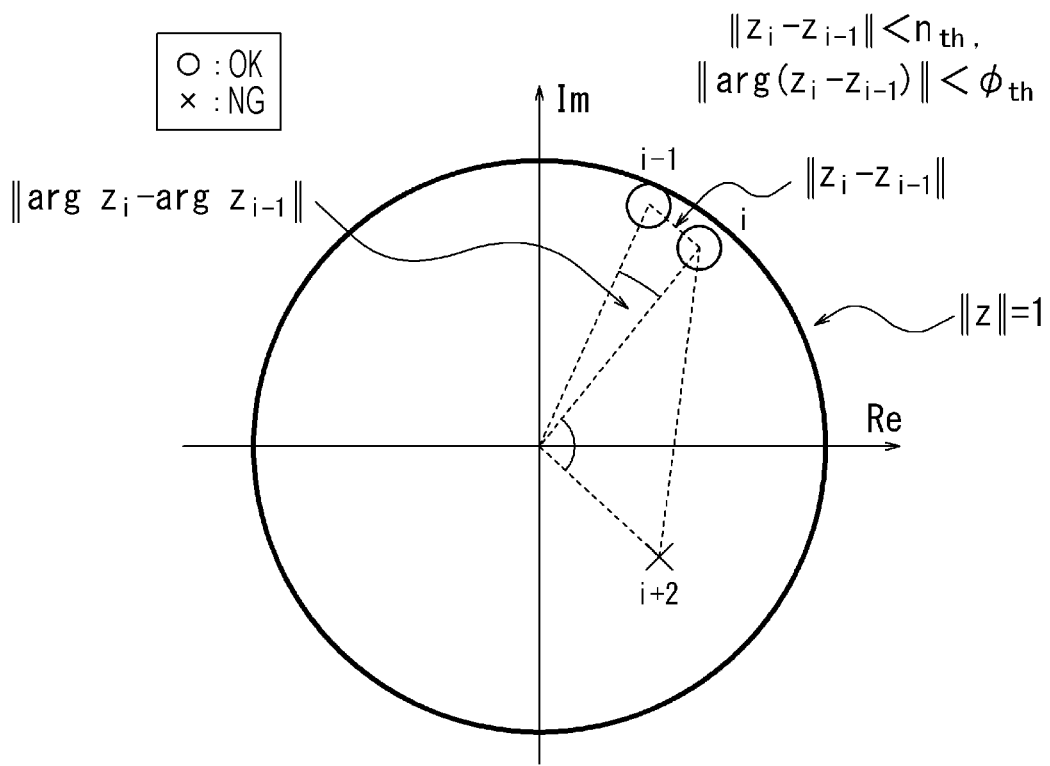
FIG. 10 is a diagram for describing the processing of the signal performed by the electronic device according to the one embodiment.

FIG. 10 is a diagram illustrating a concept of the second requirement. As in FIG. 9, FIG. 10 is a diagram illustrating an example of a state in which the solutions of the RMP are examined in the z-complex plane. Also in FIG. 10, the horizontal axis represents a real axis and the vertical axis represents an imaginary axis. In FIG. 10, a unit circle defined in the z-complex plane is indicated by a solid line.

The two solutions $z_{i-1}$ and $z_i$ of the RMP denoted by circles in FIG. 10 satisfy Expression (27) above. In this case, the signal processing unit 10 may determine that the two solutions of the RMP denoted by the circles in FIG. 10 "satisfy the second requirement (norm)". The two solutions $z_{i-1}$ and $z_i$ of the RMP denoted by the circles in FIG. 10 also satisfy Expression (28) above. In this case, the signal processing unit 10 may determine that the two solutions of the RMP denoted by the circles in FIG. 10 "satisfy the second requirement (argument)". In either case, the signal processing unit 10 may determine that "the second requirement is satisfied".

On the other hand, two points, which are the solution $z_i$ of the RMP denoted by the circle in FIG. 10 and a solution $z_{i+2}$ of the RMP denoted by a cross in FIG. 10 do not satisfy Expression (27) above. In this case, the signal processing unit 10 may determine that these two solutions of the RMP "do not satisfy the second requirement (norm)". The two points, which are the solution $z_i$ of the RMP denoted by the circle in FIG. 10 and the solution $z_{i+2}$ of the RMP denoted by the cross in FIG. 10 do not satisfy Expression (28) above. In this case, the signal processing unit 10 may determine that these two solutions of the RMP "do not satisfy the second requirement (argument)". Thus, the signal processing unit 10 may determine that the two points, which are the solution $z_i$ of the RMP denoted by the circle in FIG. 10 and the solution $z_{i+2}$ of the RMP denoted by the cross in FIG. 10 "do not satisfy the second requirement".

The index i in Expressions (27) and (28) above is an ordinal number for points sorted in ascending order of the range (distance) in the point cloud obtained by clustering in the range-Doppler plane illustrated in FIG. 5. The clustering is performed using an algorithm such as DBSCAN (Density-based Spatial Clustering of Applications with Noise). However, if the number of adjacent data points are small, the data points are not recognized as a cluster and are excluded as outliers.

The idea of the first requirement described above is obtained from fact that Root-MUSIC is based on z-transform represented by Expression (14) above. That is, in Expression (14) above, a relationship represented by Expression (31) below is satisfied.

[Math. 31]

$$\left\| e^{-j\frac{2\pi}{\lambda} d \sin\theta_l} \right\| = 1 \quad (31)$$

z-transform is used as a result of an attempt for mathematical convenience through making the MUSIC spectrum be polynomial calculation. As a result, the solutions of the RMP include those not satisfying the relationship of Expression (31) above. In particular, as indicated by Expression (23) above, in Root-MUSIC, when the perturbation is large, the absolute values of the solutions of the RMP greatly deviate from 1. Thus, in the signal processing performed by the signal processing unit 10 of the electronic device 1 according to the one embodiment, unnecessary solutions can be removed by performing selection of solutions based on the first requirement.

The second requirement described above is derived from the following idea. That is, data points sorted in ascending order of the range (distance) among the point cloud recognized to be adjacent and as a cluster are assumed. Among these data points, data points i with adjacent indices (e.g., i and i−1) are to have adjacent angles in direction-of-arrival estimation. Thus, the arguments of the solutions of the RMP are adjacent to each other in the complex plane.

As described above, the electronic device 1 according to the one embodiment includes a transmission antenna (the transmission antenna array 24) that transmits a transmission wave, a plurality of reception antennas (the reception antenna array 31) that receive a reflected wave that is the transmission wave having been reflected, and the signal processing unit 10. The signal processing unit 10 may detect an object with a subspace method, based on a transmission signal transmitted as the transmission wave and a reception signal received as the reflected wave. The signal processing unit 10 estimates the direction of arrival of the reflected wave based on solutions of an algebraic equation Root-MUSIC Polynomial (hereinafter referred to as "RMP solutions") in the Root-MUSIC method that satisfy the first requirement and the second requirement in terms of positions of the RMP solutions in the complex plane. The first requirement above may be a requirement related to a distance between the unit circle and each of the RMP solutions in the complex plane. The second requirement above may be a requirement related to a distance or an argument between at least two RMP solutions among the RMP solutions in the complex plane.

Figure 11:
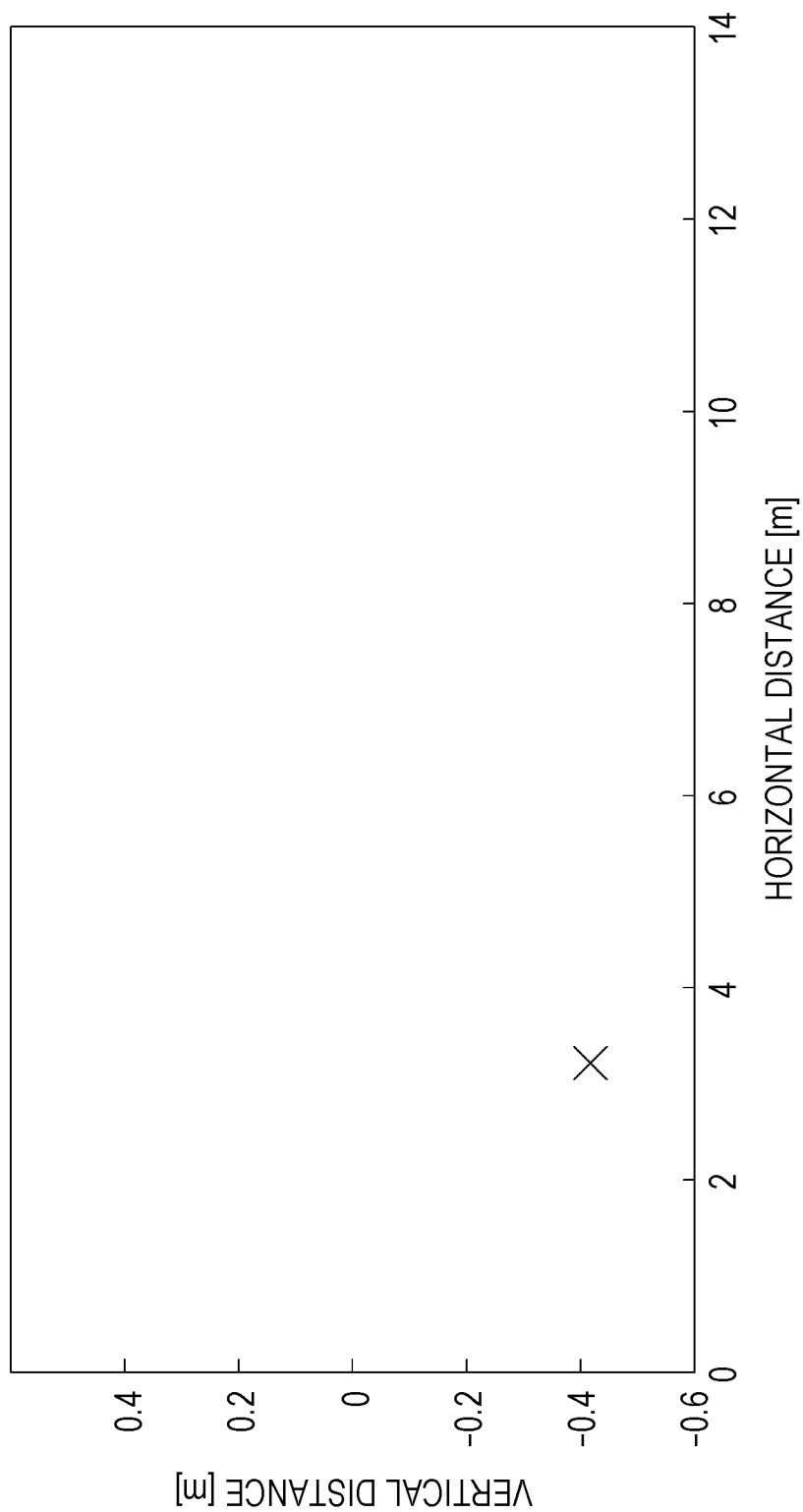
FIG. 11 is a diagram illustrating an example of the processing of the signal performed by the electronic device according to the one embodiment.

As described above, FIG. 7 illustrates the example based on the current signal processing. That is, to compare the effect with the effect of the signal processing performed by the electronic device 1 according to the one embodiment, FIG. 7 illustrates the example based on the current signal processing in which the signal processing performed by the electronic device 1 according to the one embodiment is not performed. By contrast, FIG. 11 is a diagram illustrating an example of the effect of the signal processing performed by the electronic device 1 according to the one embodiment. FIG. 11 may illustrate, for example, a result of the signal processing further performed by the electronic device 1 according to one embodiment on the result of the general signal processing illustrated in FIG. 7.

Similarly to FIG. 7, FIG. 11 is a diagram illustrating an example case where the object 200 is detected in the circumstance illustrated in FIG. 6. FIG. 11 illustrates an example displaying only the RMP solutions adopted from among the point cloud representing the object 200 in the circumstance illustrated in FIG. 6. As illustrated in FIG. 11, with the electronic device 1 according to the one embodiment, a point or a point cloud (denoted by a cross) is plotted at a position around −40 cm that is the actual vertical position of the object 200. In FIG. 7, the point cloud is also plotted at many positions different from the position around −40 cm that is the actual vertical position of the object 200. On the other hand, in the result illustrated in FIG. 11, as is apparent from comparison with FIG. 7, the number of erroneously detected points can be reduced. As illustrated in FIG. 11, unnecessary point cloud data erroneously detected is removed through the signal processing performed by the electronic device 1 according to the one embodiment, and only accurate point cloud data may be displayed.

With the electronic device 1 according to the one embodiment, the angle of arrival (direction of arrival) may be accurately estimated even when the number of reception antennas of the reception antenna array 31 is relatively small. Thus, the electronic device 1 according to the one embodiment may improve the object detection accuracy.

Another Embodiment

Another embodiment is described next.

The signal processing unit 10 of the electronic device 1 according to the embodiment described above determines that "the second requirement is satisfied" in step S6 of FIG. 8 when the two adjacent RMP solutions $z_i$ and $z_{i-1}$ satisfy at least one of Expression (27) or Expression (28) above. That is, the electronic device 1 according to the embodiment described above determines that "the second requirement is satisfied" in step S6 of FIG. 8 when at least one of the second requirement (norm) or the second requirement (argument) is satisfied.

On the other hand, in another embodiment, the signal processing unit 10 may determine that "the second requirement is satisfied" in step S6 of FIG. 8 when both the second requirement (norm) and the second requirement (argument) are satisfied. By making the determination condition stricter in this manner, the accuracy of the angle-of-arrival (direction-of-arrival) estimation may be increased.

The signal processing unit 10 of the electronic device 1 according to the embodiment described above determines whether the two adjacent RMP solutions $z_i$ and $z_{i-1}$ satisfy at least one of Expression (27) or Expression (28) above as the second requirement in step S6 of FIG. 8.

On the other hand, in the other embodiment, the signal processing unit 10 may determine whether three adjacent RMP solutions $z_{i-1}$, $z_i$, and $z_{i+1}$ satisfy at least one of Expression (32) or Expression (33) below as the second requirement in step S6 of FIG. 8.

[Math. 32]

$$\|z_i - z_{i-1}\| < n_{th} \text{ and } \|z_i - z_{i+1}\| < n_{th} \quad (32)$$

[Math. 33]

$$\|\arg(z_i - z_{i-1})\| < \phi_{th} \text{ and } \|\arg(z_i - z_{i+1})\| < \phi_{th} \quad (33)$$

When the second requirement (norm) defined by Expression (27) above and the requirement second requirement (norm) defined by the Expression (32) above are distinguished from each other, the second requirement (norm) defined by Expression (27) above and the requirement second requirement (norm) defined by the Expression (32) above may be referred to as follows. That is, the second requirement (norm) defined by Expression (27) above may be referred to as "second requirement (two-point norm)". By contrast, the second requirement (norm) defined by Expression (32) above may be referred to as "second requirement (three-point norm)".

When the second requirement (argument) defined by Expression (28) above and the requirement second requirement (argument) defined by the Expression (33) above are distinguished from each other, the second requirement (argument) defined by Expression (28) above and the requirement second requirement (argument) defined by the Expression (33) above may be referred to as follows. That is, the second requirement (argument) defined by Expression (28) above may be referred to as "second requirement (two-point argument". By contrast, the second requirement (argument) defined by Expression (33) above may be referred to as "second requirement (three-point argument)".

From the above, when the signal processing unit 10 determines that "the first requirement and the second requirement are satisfied" in step S6 of FIG. 8, at least one of the requirements below may be satisfied.

(1) first requirement and second requirement (two-point norm)
(2) first requirement and second requirement (two-point argument)
(3) first requirement, second requirement (two-point norm), and second requirement (two-point argument)
(4) first requirement and second requirement (three-point norm)
(5) first requirement and second requirement (three-point argument)
(6) first requirement, second requirement (three-point norm), and second requirement (three-point argument)

By making the determination condition stricter in the above manner, the accuracy of the angle-of-arrival (direction-of-arrival) estimation may be increased.

As described above, in one embodiment, the first requirement may be that a distance between the RMP solution and an origin of the complex plane is greater than a predetermined threshold and is equal to or less than 1. In the one embodiment, the second requirement may be that a distance between two adjacent RMP solutions among the RMP solutions in the complex plane is less than a predetermined threshold. In the one embodiment, the second requirement may be that an argument between two adjacent RMP solutions among the RMP solutions in the complex plane is less than a predetermined threshold. In the one embodiment, the second requirement may be that distances between three adjacent RMP solutions among the RMP solutions in the complex plane are less than a predetermined threshold. In the one embodiment, the second requirement may be that arguments between three adjacent RMP solutions among the RMP solutions in the complex plane are less than a predetermined threshold.

Other Embodiments

Other Embodiments are further described next.

The embodiments above have been described on the assumption of implementation as the electronic device 1 based on the radar technology, particularly the millimeter-wave radar technology. However, an electronic device according to one embodiment may be implemented based on a radar technology other than the millimeter-wave radar technology, or may be implemented based on a technology other than the radar technology. The electronic device according to the one embodiment may be implemented in, for example, a configuration of detecting a sound wave or an ultrasonic wave from a sound source with a plurality of microphones arranged in an array shape.

Figure 12:
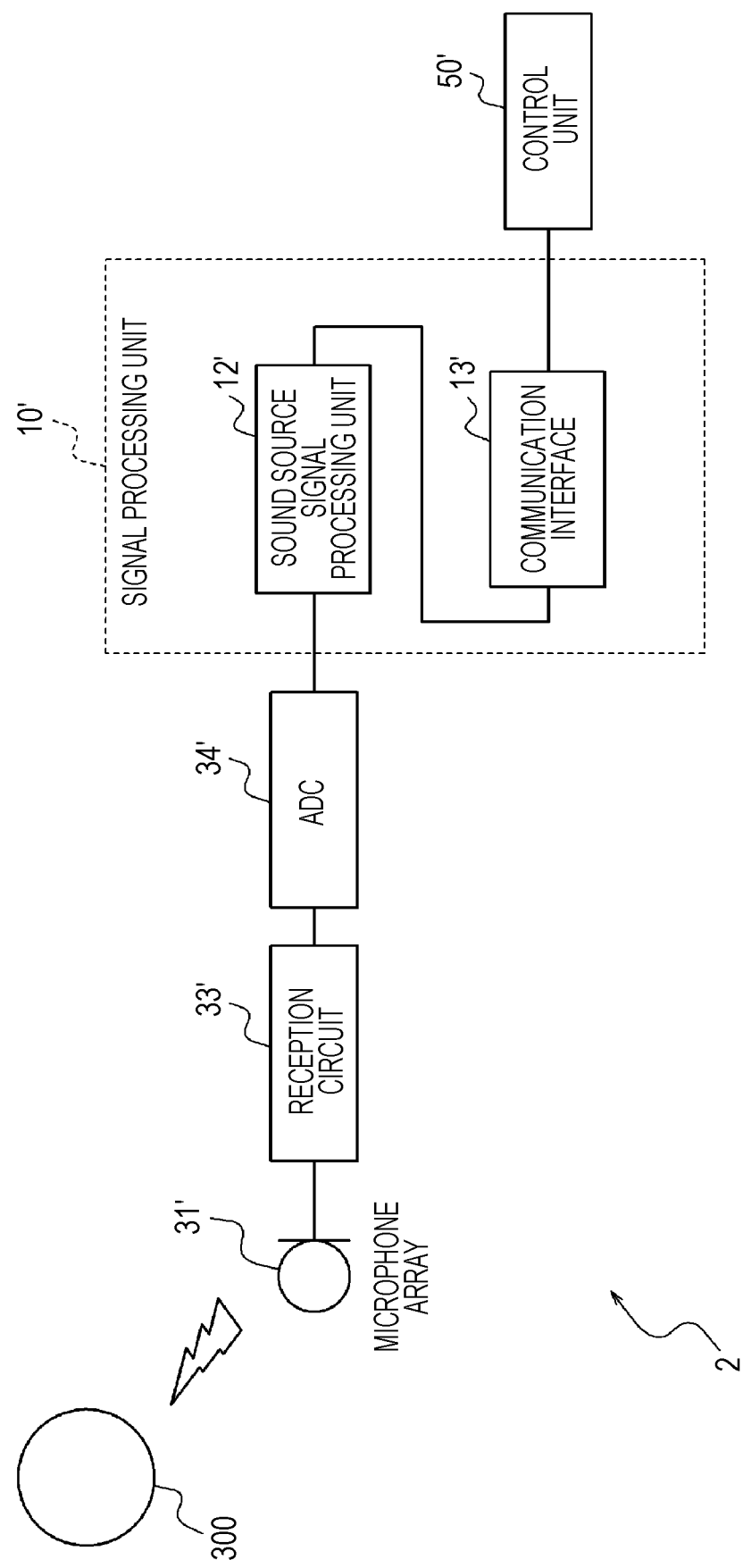
FIG. 12 is a functional block diagram schematically illustrating a configuration of an electronic device according to one embodiment.

FIG. 12 is a diagram schematically illustrating an example of a configuration of an electronic device 2 that estimates an angle of arrival of a sound wave, an ultrasonic wave, or the like arriving from a sound source 300.

The electronic device 2 illustrated in FIG. 12 detects a sound wave, an ultrasonic wave, or the like from the sound source 300, with a microphone array 31' including a plurality of microphones. The microphone array 31' may be configured based on the same and/or similar idea as the reception antenna array 31 illustrated in FIGS. 2 and 3. In the electronic device 2 illustrated in FIG. 12, a reception circuit 33' may be a circuit that receives a sound wave, an ultrasonic wave, or the like, based on the same and/or similar idea as the reception circuit 33 illustrated in FIG. 2. In the electronic device 2 illustrated in FIG. 12, an ADC 34' may be configured based on the same and/or similar idea as the reception ADC 34 illustrated in FIG. 2. In the electronic device 2 illustrated in FIG. 12, a signal processing unit 10' and a control unit 50' may be configured based on the same and/or similar idea as the signal processing unit 10 and the control unit 50 illustrated in FIG. 2, respectively. In the signal processing unit 10' illustrated in FIG. 12, a communication interface 13' may be configured based on the same and/or similar idea as the communication interface 13 illustrated in FIG. 2. On the other hand, in the signal processing unit 10' illustrated in FIG. 12, a sound source signal processing unit 12' is based on the same and/or similar idea as the reception signal processing unit 12 illustrated in FIG. 2 but may process a signal such as a sound wave or an ultrasonic wave.

As described above, the electronic device 2 illustrated in FIG. 12 may accurately estimate an angle of arrival of a sound wave, an ultrasonic wave, or the like arriving from the sound source 300.

As described above, the electronic device 2 according to the one embodiment may include a plurality of sensors (the microphone array 31') that receive a sound wave or an ultrasonic wave from a sound source, and the signal processing unit 10' that detects an object with a subspace method, based on a reception signal received as the sound wave or the ultrasonic wave. The signal processing unit 10' estimates the direction of arrival of the sound wave or the ultrasonic wave, based on solutions of an algebraic equation Root-MUSIC Polynomial (hereinafter referred to as "RMP solutions") in the Root-MUSIC method that satisfy the first requirement and the second requirement in terms of positions of the RMP solutions in the complex plane. The first requirement may be a requirement related to a distance between a unit circle and each of the RMP solutions in the complex plane. The second requirement may be a requirement related to a distance or an argument between at least two RMP solutions among the RMP solutions in the complex plane.

The electronic device 1 according to the present disclosure may include a display unit that displays an image or the like. In this case, the signal processing unit 10 may estimate the direction of arrival of the reflected wave by removing a solution not satisfying a requirement related to a position, in the complex plane, of a solution of an algebraic equation Root-MUSIC Polynomial in the Root-MUSIC method. The display unit of the electronic device 1 may display the direction of arrival estimated in the manner described above.

While the present disclosure has been described on the basis of the various drawings and the embodiments, it should be noted that a person skilled in the art can easily make various variations or corrections on the basis of the present disclosure. Therefore, it should be noted that these variations or corrections are within the scope of the present disclosure. For example, functions and the like included in each functional unit can be rearranged without causing any logical contradiction. A plurality of functional units or the like may be combined into one or may be divided. The embodiments according to the present disclosure described above are not limited to strict implementation according to the respective embodiments described above, and may be implemented by appropriately combining the features or omitting part thereof. That is, a person skilled in the art can make various variations and corrections to the contents of the present disclosure on the basis of the present disclosure. Accordingly, these variations and corrections are within the scope of the present disclosure. For example, in each embodiment, each functional unit, each means, each step, or the like can be added to another embodiment or replaced with each functional unit, each means, each step, or the like in another embodiment without causing any logical contradiction. In each embodiment, a plurality of functional units, means, steps, or the like may be combined into one or may be divided. In addition, the embodiments according to the present disclosure described above are not limited to strict implementation according to the respective embodiments described above, and may be implemented by appropriately combining the features or omitting part thereof.

The embodiments described above are not limited to implementation as the electronic device 1 or 2. For example, the embodiments described above may be implemented as a method for controlling a device such as the electronic device 1 or 2. For example, the embodiments described above may be implemented as a program executed by a device such as the electronic device 1 or 2.

REFERENCE SIGNS LIST

1, 2 electronic device
10, 10' signal processing unit
11 signal generation processing unit
12 reception signal processing unit
12' sound source signal processing unit
13, 13' communication interface
21 transmission DAC
22 transmission circuit
23 RF transmission circuit
24 transmission antenna array
31 reception antenna array
31' microphone array
32 mixer
33, 33' reception circuit
34 reception ADC
34' ADC
50, 50' control unit

The invention claimed is:

1. An electronic device comprising:
   a transmission antenna configured to transmit a transmission wave;
   a plurality of reception antennas configured to receive a reflected wave that is the transmission wave having been reflected; and
   a signal processing unit configured to detect an object with a subspace method, based on a transmission signal transmitted as the transmission wave and a reception signal received as the reflected wave, wherein
   the signal processing unit is configured to estimate a direction of arrival of the reflected wave, based on solutions of an algebraic equation Root-MUSIC Polynomial (hereinafter referred to as "RMP solutions") in a Root-MUSIC method that satisfy a first requirement and a second requirement in terms of positions of the RMP solutions in a complex plane,
   the first requirement being a requirement related to a distance between a unit circle and each of the RMP solutions in the complex plane,
   the second requirement being a requirement related to a distance or an argument between at least two adjacent RMP solutions among the RMP solutions in the complex plane, and the second requirement is determined by calculating a difference between norms of the at least two adjacent RMP solutions or by calculating a difference between arguments of the at least two adjacent RMP solutions.

2. The electronic device according to claim 1, wherein the first requirement is that a distance between each of the RMP solutions and an origin of the complex plane is greater than a predetermined threshold and is equal to or less than 1.

3. The electronic device according to claim 1, wherein the second requirement is that the distance between the two adjacent RMP solutions among the RMP solutions in the complex plane is less than a predetermined threshold.

4. The electronic device according to claim 1, wherein the second requirement is that the argument between the two adjacent RMP solutions among the RMP solutions in the complex plane is less than a predetermined threshold.

5. The electronic device according to claim 1, wherein the second requirement is that distances between three adjacent RMP solutions among the RMP solutions in the complex plane are less than a predetermined threshold.

6. The electronic device according to claim 1, wherein the second requirement is that arguments between three adjacent RMP solutions among the RMP solutions in the complex plane are less than a predetermined threshold.

7. The electronic device according to claim 1, wherein the plurality of reception antennas are arranged in a straight line to form a reception antenna array.

8. An electronic device comprising:
a plurality of sensors configured to receive a sound wave or an ultrasonic wave from a sound source; and
a signal processing unit configured to detect an object with a subspace method, based on a reception signal received as the sound wave or the ultrasonic wave, wherein
the signal processing unit is configured to estimate a direction of arrival of the sound wave or the ultrasonic wave, based on solutions of an algebraic equation Root-MUSIC Polynomial (hereinafter referred to as "RMP solutions") in a Root-MUSIC method that satisfy a first requirement and a second requirement in terms of positions of the RMP solutions in a complex plane,
the first requirement being a requirement related to a distance between a unit circle and each of the RMP solutions in the complex plane,
the second requirement being a requirement related to a distance or an argument between at least two adjacent RMP solutions among the RMP solutions in the complex plane, and the second requirement is determined by calculating a difference between norms of the at least two adjacent RMP solutions or by calculating a difference between arguments of the at least two adjacent RMP solutions.

9. A method for controlling an electronic device, the method comprising:
a step of transmitting a transmission wave with a transmission antenna;
a step of receiving, with a plurality of reception antennas, a reflected wave that is the transmission wave having been reflected;
a step of detecting an object with a subspace method, based on a transmission signal transmitted as the transmission wave and a reception signal received as the reflected wave; and
a step of estimating a direction of arrival of the reflected wave, based on solutions of an algebraic equation Root-MUSIC Polynomial (hereinafter referred to as "RMP solutions") in a Root-MUSIC method that satisfy a first requirement and a second requirement in terms of positions of the RMP solutions in a complex plane,
the first requirement being a requirement related to a distance between a unit circle and each of the RMP solutions in the complex plane,
the second requirement being a requirement related to a distance or an argument between at least two adjacent RMP solutions among the RMP solutions in the complex plane, and the second requirement is determined by calculating a difference between norms of the at least two adjacent RMP solutions or by calculating a difference between arguments of the at least two adjacent RMP solutions.

10. A non-transitory computer-readable recording medium storing computer program instructions, which when executed by a computer, cause the computer to:
transmit a transmission wave with a transmission antenna;
receive, with a plurality of reception antennas, a reflected wave that is the transmission wave having been reflected;
detect an object with a subspace method, based on a transmission signal transmitted as the transmission wave and a reception signal received as the reflected wave; and
estimate a direction of arrival of the reflected wave, based on solutions of an algebraic equation Root-MUSIC Polynomial (hereinafter referred to as "RMP solutions") in a Root-MUSIC method that satisfy a first requirement and a second requirement in terms of positions of the RMP solutions in a complex plane,
the first requirement being a requirement related to a distance between a unit circle and each of the RMP solutions in the complex plane,
the second requirement being a requirement related to a distance or an argument between at least two adjacent RMP solutions among the RMP solutions in the complex plane, and the second requirement is determined by calculating a difference between norms of the at least two adjacent RMP solutions or by calculating a difference between arguments of the at least two adjacent RMP solutions.

11. An electronic device comprising:
a transmission antenna configured to transmit a transmission wave;
a plurality of reception antennas configured to receive a reflected wave that is the transmission wave having been reflected;
a signal processing unit configured to detect an object with a subspace method, based on a transmission signal transmitted as the transmission wave and a reception signal received as the reflected wave; and
a display unit configured to display an image, wherein
the signal processing unit is configured to estimate a direction of arrival of the reflected wave by removing a first solution not satisfying a requirement related to a distance or an argument between the first solution and at least one second solution adjacent to the first solution in a complex plane, and the signal processing unit is configured to determine whether the first solution satisfies the requirement by calculating a difference between norms of the first solution and the at least one second solution or by calculating a difference between arguments of the first solution and the at least one second solution, and
the display unit is configured to display the estimated direction of arrival.

12. The electronic device according to claim 1, wherein the at least two adjacent RMP solutions have consecutive ordinal numbers for points of the RMP solutions sorted in order of range in a clustered point cloud in a range-Doppler plane.

13. The electronic device according to claim 8, wherein the at least two adjacent RMP solutions have consecutive ordinal numbers for points of the RMP solutions sorted in order of range in a clustered point cloud in a range-Doppler plane.

14. The method according to claim 9, wherein the at least two adjacent RMP solutions have consecutive ordinal numbers for points of the RMP solutions sorted in order of range in a clustered point cloud in a range-Doppler plane.

15. The non-transitory computer-readable recording medium according to claim 10, wherein the at least two adjacent RMP solutions have consecutive ordinal numbers for points of the RMP solutions sorted in order of range in a clustered point cloud in a range-Doppler plane.

16. The electronic device according to claim 11, wherein the signal processing unit is configured to determine solutions of an algebraic equation Root-MUSIC Polynomial (hereinafter referred to as "RMP solutions"), and the first solution and the at least one second solution have consecutive ordinal numbers for points of the RMP solutions sorted in order of range in a clustered point cloud in a range-Doppler plane.

* * * * *